United States Patent
Solosky

(10) Patent No.: US 10,678,204 B2
(45) Date of Patent: Jun. 9, 2020

(54) UNIVERSAL ANALOG CELL FOR CONNECTING THE INPUTS AND OUTPUTS OF DEVICES

(71) Applicant: Honeywell International Inc., Morris Plains, NJ (US)

(72) Inventor: Rick Solosky, Plymouth, MN (US)

(73) Assignee: Honeywell International Inc., Morris Plains, NJ (US)

(*) Notice: Subject to any disclaimer, the term of this patent is extended or adjusted under 35 U.S.C. 154(b) by 806 days.

(21) Appl. No.: 14/869,808

(22) Filed: Sep. 29, 2015

(65) Prior Publication Data

US 2016/0123624 A1    May 5, 2016

Related U.S. Application Data

(60) Provisional application No. 62/057,684, filed on Sep. 30, 2014.

(51) Int. Cl.
    G05B 19/042    (2006.01)

(52) U.S. Cl.
    CPC ........... G05B 19/0423 (2013.01); *G05B 2219/21009* (2013.01); *G05B 2219/23258* (2013.01)

(58) Field of Classification Search
    CPC ...... G05B 19/0423; G05B 2219/21009; G05B 2219/23258
    See application file for complete search history.

(56) References Cited

U.S. PATENT DOCUMENTS

| | | |
|---|---|---|
| 3,425,780 A | 2/1969 | Potts |
| 3,520,645 A | 7/1970 | Cotton et al. |
| 3,649,156 A | 3/1972 | Conner |
| 3,681,001 A | 8/1972 | Potts |
| 3,836,857 A | 9/1974 | Ikegami et al. |
| 3,909,816 A | 9/1975 | Teeters |
| 4,157,506 A | 6/1979 | Spencer |
| 4,221,557 A | 9/1980 | Jalics |
| 4,242,079 A | 12/1980 | Matthews |
| 4,269,589 A | 5/1981 | Matthews |
| 4,280,184 A | 7/1981 | Weiner et al. |

(Continued)

FOREIGN PATENT DOCUMENTS

| | | |
|---|---|---|
| EP | 0325356 | 7/1989 |
| EP | 0276937 | 7/1991 |

(Continued)

OTHER PUBLICATIONS

Honeywell SLATE Analog I/O Module R8001U3001 Installation Instructions, retrieved Dec. 2018. (Year: 2018).*

(Continued)

*Primary Examiner* — Mushfique Siddique

(57) ABSTRACT

A universal analog cell that has electronic circuits that can be configured with a processor using a program designed for connection to one or more of a large range of various sensor and actuator types. The cell may have just a few terminals, for example four terminals, that can be configured for a wide range of components. A sensor or actuator which inherently requires several terminals may be implemented using all the terminals of the cell, but the cell may also support multiple input or output features as long as each of these features requires less than all terminals of the cell.

12 Claims, 19 Drawing Sheets

(56) References Cited

U.S. PATENT DOCUMENTS

| | | | |
|---|---|---|---|
| 4,303,385 A | 12/1981 | Rudich, Jr. et al. | |
| 4,370,557 A | 1/1983 | Axmark et al. | |
| 4,450,499 A | 5/1984 | Sorelle | |
| 4,457,692 A | 7/1984 | Erdman | |
| 4,483,672 A | 11/1984 | Wallace et al. | |
| 4,519,771 A | 5/1985 | Six et al. | |
| 4,521,825 A | 6/1985 | Crawford | |
| 4,527,247 A | 7/1985 | Kaiser et al. | |
| 4,555,800 A | 11/1985 | Nishikawa et al. | |
| 4,622,005 A | 11/1986 | Kuroda | |
| 4,626,193 A | 12/1986 | Gann | |
| 4,641,108 A | 2/1987 | Gill, Jr. | |
| 4,655,705 A | 4/1987 | Shute et al. | |
| 4,672,324 A | 6/1987 | van Kampen | |
| 4,695,246 A | 9/1987 | Bellfuss et al. | |
| 4,701,878 A | 10/1987 | Gunkel et al. | |
| 4,709,155 A | 11/1987 | Yamaguchi et al. | |
| 4,777,607 A * | 10/1988 | Maury | H02J 13/0086 307/86 |
| 4,830,601 A | 5/1989 | Dahlander et al. | |
| 4,842,510 A | 6/1989 | Grunden et al. | |
| 4,843,084 A | 6/1989 | Parker et al. | |
| 4,872,828 A | 10/1989 | Mierzwinski et al. | |
| 4,904,986 A | 2/1990 | Pinckaers | |
| 4,949,355 A | 8/1990 | Dyke et al. | |
| 4,955,806 A | 9/1990 | Grunden et al. | |
| 5,026,270 A | 6/1991 | Adams et al. | |
| 5,026,272 A | 6/1991 | Takahashi et al. | |
| 5,037,291 A | 8/1991 | Clark | |
| 5,073,769 A | 12/1991 | Kompelien | |
| 5,077,550 A | 12/1991 | Cormier | |
| 5,112,117 A | 5/1992 | Altmann et al. | |
| 5,126,721 A | 6/1992 | Butcher et al. | |
| 5,158,477 A | 10/1992 | Testa et al. | |
| 5,175,439 A | 12/1992 | Harer et al. | |
| 5,222,888 A | 6/1993 | Jones et al. | |
| 5,236,328 A | 8/1993 | Tate et al. | |
| 5,255,179 A | 10/1993 | Zekan et al. | |
| 5,276,630 A | 1/1994 | Baldwin et al. | |
| 5,280,802 A | 1/1994 | Comuzie, Jr. | |
| 5,300,836 A | 4/1994 | Cha | |
| 5,347,982 A | 9/1994 | Blazer et al. | |
| 5,365,223 A | 11/1994 | Sigafus | |
| 5,391,074 A | 2/1995 | Meeker | |
| 5,424,554 A | 6/1995 | Marran et al. | |
| 5,446,677 A | 8/1995 | Jensen et al. | |
| 5,472,336 A | 12/1995 | Adams et al. | |
| 5,506,569 A | 4/1996 | Rowlette | |
| 5,567,143 A | 10/1996 | Servidio | |
| 5,599,180 A | 2/1997 | Peters et al. | |
| 5,682,329 A | 10/1997 | Seem et al. | |
| 5,722,823 A | 3/1998 | Hodgkiss | |
| 5,748,466 A * | 5/1998 | McGivern | A01G 25/16 239/63 |
| 5,797,358 A | 8/1998 | Brandt et al. | |
| 5,971,745 A | 10/1999 | Bassett et al. | |
| 6,060,719 A | 5/2000 | DiTucci et al. | |
| 6,071,114 A | 6/2000 | Cusack et al. | |
| 6,084,518 A | 7/2000 | Jamieson | |
| 6,127,742 A * | 10/2000 | Weynachter | G05B 19/0423 307/38 |
| 6,172,432 B1 | 1/2001 | Schnackenberg et al. | |
| 6,222,719 B1 | 4/2001 | Kadah | |
| 6,261,086 B1 | 7/2001 | Fu | |
| 6,299,433 B1 | 10/2001 | Gauba et al. | |
| 6,346,712 B1 | 2/2002 | Popovic et al. | |
| 6,349,156 B1 | 2/2002 | O'Brien et al. | |
| 6,356,827 B1 | 3/2002 | Davis et al. | |
| 6,381,503 B1 | 4/2002 | Dollhopf et al. | |
| 6,385,510 B1 | 5/2002 | Hoog et al. | |
| 6,457,692 B1 | 10/2002 | Gohl, Jr. | |
| 6,474,979 B1 | 11/2002 | Rippelmeyer | |
| 6,486,486 B1 | 11/2002 | Haupenthal | |
| 6,509,838 B1 | 1/2003 | Payne et al. | |
| 6,552,865 B2 | 4/2003 | Cyrusian | |
| 6,676,404 B2 | 1/2004 | Lochschmied | |
| 6,743,010 B2 | 6/2004 | Bridgeman et al. | |
| 6,782,345 B1 | 8/2004 | Siegel et al. | |
| 6,794,771 B2 | 9/2004 | Orloff | |
| 6,912,671 B2 | 6/2005 | Christensen et al. | |
| 6,917,888 B2 | 7/2005 | Logvinov et al. | |
| 6,923,640 B2 | 8/2005 | Canon | |
| 7,076,311 B2 | 7/2006 | Schuster | |
| 7,088,137 B2 | 8/2006 | Behrendt et al. | |
| 7,088,253 B2 | 8/2006 | Grow | |
| 7,202,794 B2 | 4/2007 | Huseynov et al. | |
| 7,241,135 B2 | 7/2007 | Munsterhuis et al. | |
| 7,242,116 B2 | 7/2007 | Kawazu et al. | |
| 7,255,285 B2 | 8/2007 | Troost et al. | |
| 7,274,973 B2 | 9/2007 | Nichols et al. | |
| 7,289,032 B2 | 10/2007 | Seguin et al. | |
| 7,327,269 B2 | 2/2008 | Kiarostami | |
| 7,617,691 B2 | 11/2009 | Street et al. | |
| 7,728,736 B2 | 6/2010 | Leeland et al. | |
| 7,764,182 B2 | 7/2010 | Chian et al. | |
| 7,768,410 B2 | 8/2010 | Chian | |
| 7,800,508 B2 | 9/2010 | Chian et al. | |
| 7,822,896 B1 * | 10/2010 | Sagues | G05B 19/054 710/104 |
| 8,085,521 B2 | 12/2011 | Chian | |
| 8,299,559 B2 | 10/2012 | Nazarian | |
| 8,390,324 B2 | 3/2013 | Fletcher et al. | |
| 8,601,291 B2 | 12/2013 | Ewing et al. | |
| 8,656,065 B1 * | 2/2014 | Gerhart | G06F 13/385 370/236 |
| 8,769,158 B2 | 7/2014 | Kretschmann et al. | |
| 2002/0059467 A1 * | 5/2002 | Rapp | G05B 19/0421 709/250 |
| 2002/0099474 A1 | 7/2002 | Khesin | |
| 2002/0193890 A1 * | 12/2002 | Pouchak | F23N 5/24 700/21 |
| 2003/0143503 A1 | 7/2003 | Wild et al. | |
| 2003/0222982 A1 | 12/2003 | Hamdan et al. | |
| 2004/0209209 A1 | 10/2004 | Chodacki et al. | |
| 2005/0086341 A1 | 4/2005 | Enga et al. | |
| 2006/0155900 A1 * | 7/2006 | Sagues | G05B 19/0423 710/72 |
| 2006/0257805 A1 | 11/2006 | Nordberg et al. | |
| 2007/0159978 A1 | 7/2007 | Anglin et al. | |
| 2007/0188971 A1 | 8/2007 | Chian et al. | |
| 2008/0010049 A1 * | 1/2008 | Pouchak | G05B 19/0426 703/14 |
| 2009/0009344 A1 | 1/2009 | Chian | |
| 2009/0056649 A1 | 3/2009 | MacKenzie | |
| 2009/0136883 A1 | 5/2009 | Chian et al. | |
| 2010/0013644 A1 | 1/2010 | McDonald et al. | |
| 2010/0185857 A1 * | 7/2010 | Neitzel | G05B 19/0428 713/168 |
| 2010/0265075 A1 | 10/2010 | Chian | |
| 2011/0207064 A1 | 8/2011 | Salani et al. | |
| 2015/0192940 A1 * | 7/2015 | Silva | H04L 12/2809 700/276 |
| 2016/0091205 A1 | 3/2016 | Solosky et al. | |
| 2016/0091903 A1 | 3/2016 | Patton et al. | |
| 2016/0092388 A1 | 3/2016 | Sorenson et al. | |
| 2016/0098055 A1 | 4/2016 | Solosky et al. | |
| 2016/0123624 A1 | 5/2016 | Solosky | |

FOREIGN PATENT DOCUMENTS

| | | |
|---|---|---|
| EP | 0967440 | 12/1999 |
| EP | 1148298 | 10/2001 |
| EP | 2388960 | 12/2012 |
| WO | WO 91/02300 | 2/1991 |
| WO | WO 97/18417 | 5/1997 |
| WO | WO 2005/098954 | 10/2005 |
| WO | WO 2008/144308 | 11/2008 |

OTHER PUBLICATIONS

Honeywell SLATE Integrated Combustion Management System R8001 Series User Guide, retrieved Dec. 2018. (Year: 2018).*

(56) References Cited

OTHER PUBLICATIONS

Benson et al., "Power Plant MOM (Multimedia Operation and Monitoring)," 9 pages, prior to Mar. 28, 2013.
Buxton, "Totally Reconfigurable Analog Circuit, Concept and Practical Implementation," IEEE, pp. 292-295, 1999.
Description of "Smart Analog, Press Release," Renesas Electronics, 1 page, prior to Mar. 29, 2013. (Unable to obtain copy of the actual press release, the description only is provided).
Fireye, "YB110/YB230 Fireye BurnerLogiX, Microprocessor-Based Integrated Burner Management Cotnrol," 62 pages, May 4, 2011.
Honeywell, "R7910A SOLA HC (Hydronic Control), R7911 SOLA SC (Steam Control), Product Data," 122 pages, Nov. 2009.
https://www.rensas.com/en-us/products/smart-analog/smart-analog-f . . . , "Smart Analog Features," Renesas Electronics, 4 pages, printed Jun. 28, 2016.
Huebner et al., "Real-Time Lut-Based Network Topologies for Dynamic and Partial FPGA Self-Reconfiguration," ACM, pp. 28-32, 2004.
Rockwell Automation Inc., "GuardLogix Integrated Safety System," 1 page, 2013.
Siemens Building Technologies, "Combustion Control Systems," 12 pages, Nov. 11, 2005.
Honeywell, "S4965 SERIES Combined Valve and Boiler Control Systems," 16 pages, prior to Jul. 3, 2007.
Honeywell, "SV9410/SV9420; SV9510/SV9520; SV9610/SV9620 SmartValve System Controls," Installation Instructions, 16 pages, 2003.
www.playhookey.com, "Series LC Circuits," 5 pages, printed Jun. 15, 2007.

\* cited by examiner

UNIVERSAL ANALOG CELL FOR CONNECTING THE INPUTS AND OUTPUTS OF DEVICES

The present application claims the benefit of U.S. Provisional Patent Application No. 62/057,684, filed Sep. 30, 2014. U.S. Provisional Patent Application No. 62/057,684, filed Sep. 30, 2014, is hereby incorporated by reference.

BACKGROUND

The present disclosure pertains to electronic interfaces and particularly to inputs and outputs for connection of devices such as sensors and actuators. Many controllers such as those used for combustion control or HVAC may need analog signal inputs and outputs to connect various kinds of sensors and actuators, or other components. Each general type of sensor may need a specific version of a controller to provide compatible inputs and outputs. This may result in a proliferation of controller versions, increase inventory, and complicate selection for those who sell, purchase, and provide services for the systems.

One way to avoid the proliferation may be to include interfaces to different types of sensors on each controller, as separate wiring terminals. This may create an additional issue. Often after a controller is installed for a particular application, there may be unused terminals. The terminal factor may make the controller larger than an ideal one, due to the number of terminals needed. Such system may emphasize to the customer that they are paying for features that they are not using which creates a sales issue, and in fact it may be more expensive to produce than the ideal one, since unused terminals and electronics would be provided.

SUMMARY

The disclosure reveals a universal analog cell that has electronic circuits that can be configured with a processor using a program designed for connection to one or more of a large range of various sensor and actuator types. The cell may have just a few terminals, for example four terminals, that can be configured for a wide range of components. A sensor or actuator which inherently requires several terminals may be implemented using all the terminals of the cell, but the cell may also support multiple input or output features as long as each of these features requires less than all terminals of the cell.

DESCRIPTION

Figure 1:
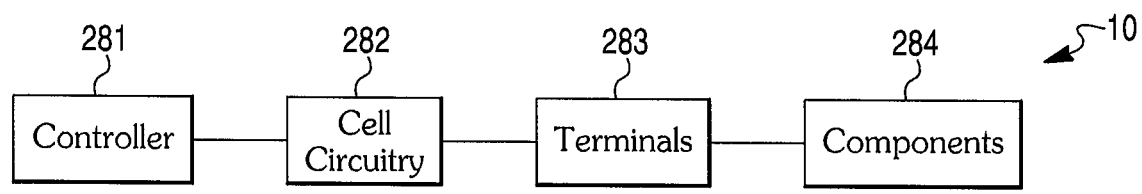
FIG. 1 is a diagram of a basic configuration of a cell system.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

The present system may consist of an "analog cell" that includes electronic circuits which can be configured with a processor, controller or microcomputer using programs designed to connect to a large range of different kinds of sensors and actuators, or other components. When the cell is incorporated in a controller, computer, processor or equivalent, along with the program to configure the cell, virtually any kind of sensor or actuator may be supported by the controller or the like. The term "controller" may be used to refer to a controller, process, a computer, including an interface with a display of a screen and keyboard and a mouse, memory as needed, a mechanism for entering and executing programs, and so forth.

A configuration for a particular sensor or actuator may be performed by an OEM customer who sets up the controller for a particular purpose, or performed by an installer who has selected an appropriate or needed sensor or actuator. A need for numerous and different controllers for various kinds of, for example, sensors and actuators, may go away.

The present analog cell may have only a few terminals which are to be configured for a wide range of components and purposes. A sensor or actuator which inherently needs several terminals may be implemented using most or all of the terminals; however, a cell may also support multiple input or output features or components if each of the features or components requires less than all of the terminals.

For instance, in a case of a four terminal cell, components that need an entire cell may be a bridge sensor, negative temperature coefficient (NTC) sensor, resistance temperature detector (RTD), powered potentiometer, actuator with feedback, and the like. Items that just need part of a cell (where multiples of such items can occur per cell) may consist of current input, current output, voltage input, voltage output, thermocouple input, voltage threshold detection, tachometer input, pulse width modulation (PWM) input, PWM output, a frequency/pulse generator, and so on.

The system may differ in the breadth of coverage of sensor and actuator types. It may use a custom designed circuit to accomplish the coverage.

The electronics of the present system may be included in a controller, and a program to configure the electronics can be provided as part of a user interface to the controller. Configuration options may be selected by a designer or installer who is applying the controller, by making selections from typical dialog box items such as pop-up lists, checkboxes, and radio buttons in a screen on a display. An example of the configuration may exist as a PC program described in conjunction with FIGS. 6-18. The program and cells may have, for example, a particular application to components and circuits of heating, ventilation and air conditioning (HVAC) systems.

Along with the program, the controller may have an interface screen displaying three radio buttons at the top that may be clicked on to select which kind of module is being represented to incorporate an analog I/O module, a fuel air module, or a limit module. The fuel air module may contain two cells, the other two modules may each contain four cells although the program appears to show just two cells (the other cells may be identical). Each cell may have a set of four terminals along with the circuit and configuration parameters that allow the cell to be operated in various ways. Per a program, configuration choices may be represented by checkboxes.

The most general form of a cell may be shown by the analog I/O module. The module may provide very flexible combinations of non-safety analog inputs and outputs for "wire sheet" programmable logic (similar to PLC ladder logic).

The fuel air and limit safety modules may also have fully functional analog cells, but when using the modules for their own safety I/O, they may restrict the configurations that are allowed. However, a feature for both of these safety modules is that any cell not necessarily needed for local safety use may be "donated" for more general use by the wire sheet logic. Thus, when a fuel air or limit is chosen in the demo, each of the two cells in those cases may have a radio button to either have the cell be used for the local safety purpose, or donated as a full-featured "wire sheet" cell. For fuel air, the local safety purpose may be called a VFD (variable frequency drive), which is a kind of variable speed motor).

The radio buttons may be used to set up an interface for an example component, and then one can try all of the features by using the checkboxes. Any combination that one can create in the program may be possible in the device, and vice versa. Any combination that one cannot create is not necessarily allowed. A location of a checkbox may correspond to the terminal or terminals that carry the active signal or signals. In those cases, where an I/O function uses multiple terminals, this situation may be indicated by vertical lines.

In a wire sheet mode, the lighter bars for T1, T2, and T3 may turn dark to show when a terminal has been used by a feature that has been selected. The dark color may indicate that if one then clicks another checkbox within the dark bar, then a previous feature will be removed to give way to a new one. One may click to turn checkboxes off as well as on and, of course, trying that may make it more clear what those dark bars show.

The darker bars are not necessarily used when demonstrating a Fuel Air or Limit cell, because the categories may have much simpler rules that can be shown as "1 input only" for a Limit cell, and "1 output, 1 input" for a Fuel Air VFD cell.

Figure 6:
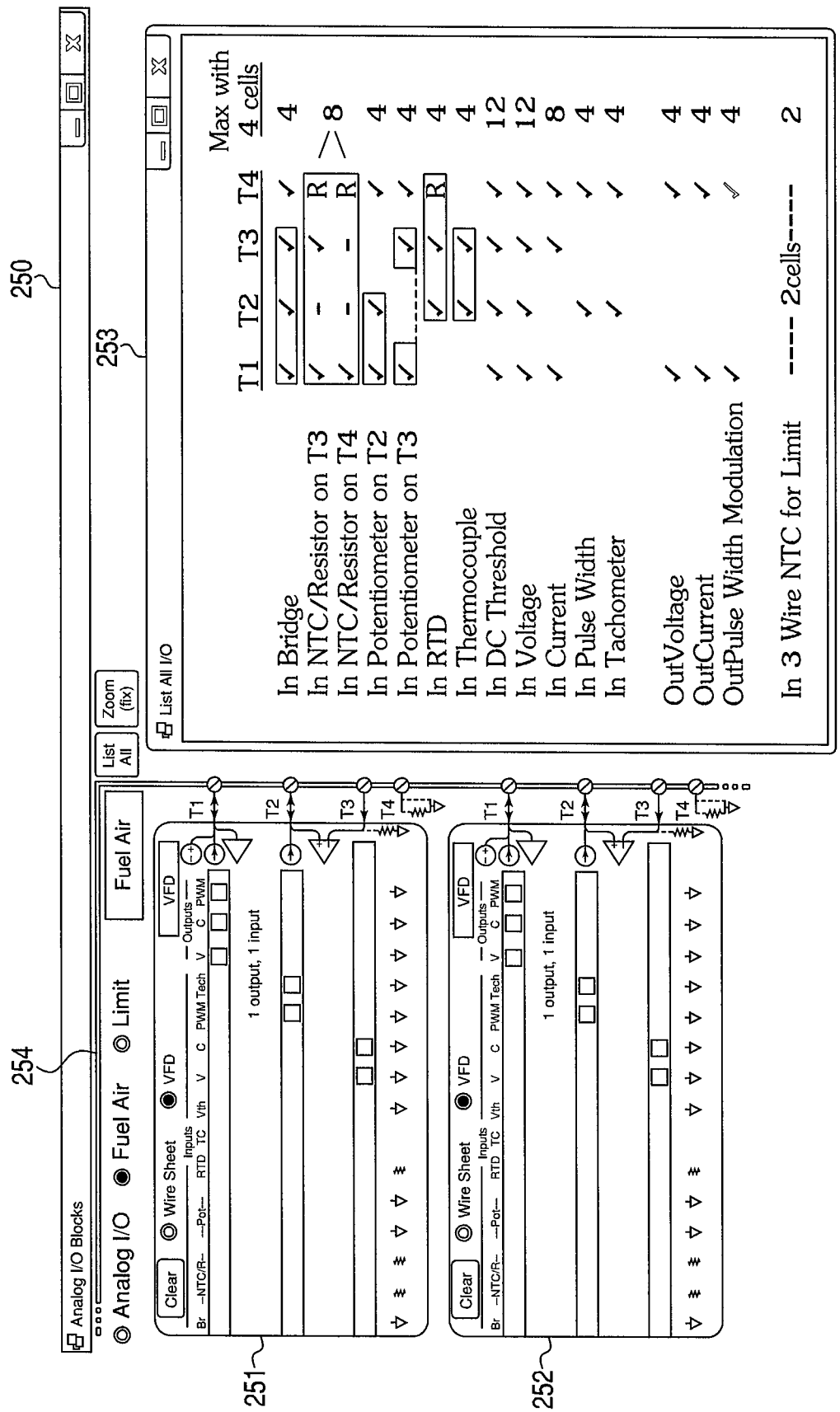
FIG. 6 is a diagram of a screenshot of a display of wire sheets for cell blocks and a list of interface components for the cells.

An X on T2 may indicate that even though nothing is hooked up there, it cannot necessarily be used if that feature is selected. The NTC inputs may be special, as shown, in that if a NTC sensor is used, then the only other thing that also might be on the same cell is a second NTC sensor. Two potentiometers may also be special, as shown, in that they may share T1 with each other but not with anything else. A row of icons to the left of T4 may indicate whether it is a signal ground/common terminal, or instead if it has a series resistance switched in (needed for NTC and RTD sensors) and generally cannot be used as a common terminal. The button "List All" may show a table of virtually all possibilities (FIG. 6).

FIG. 1 is a diagram of a basic configuration of a cell system 10. A controller 281 may provide an interface, processing, including configuring from a program, for cell circuitry 282 to provide appropriate electrical values at a set of terminals 283 for connection by different components 284 where each component is connected to the same terminals 283 of a multitude of cell circuitries 282 that are the same, or is connected to the same cell circuitry 282 at different times.

Figure 1A:
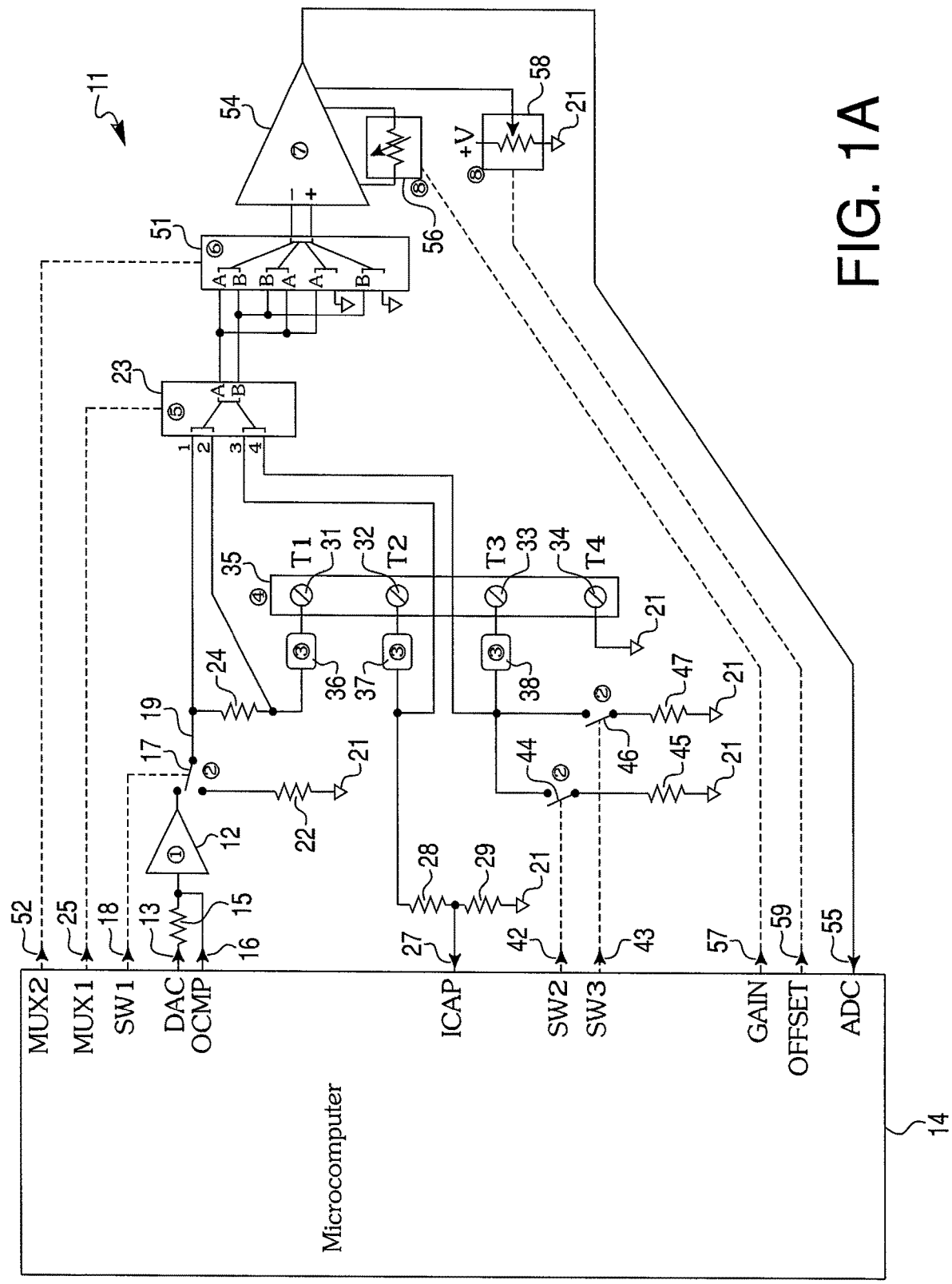
FIG. 1a is a diagram of a more detailed layout showing an analog cell.

FIG. 1a is a diagram showing a layout of an analog cell 11. A power amplifier 12 may have an input connected a digital to analog converter output 13 from a microcomputer 14 via a resistor 15. The input of amplifier 12 may also be connected to a timer output compare 16 of computer 14. An output amplifier 12 may go to an analog switch 17 that may have an input connected to a first switch control output 18 from computer 14. Output 18 may cause a switch 17 output 19 to be connected to output 18 or to a ground or voltage reference 21 via a resistor 22. Output 19 may go a first input of a dual 2:1 multiplexor 23. Output 19 may be connected to a second input of multiplexer 23 via a resistor 24. The connection to the second input of multiplexor 23 may be connected to an input protection circuit 36 (e.g., diodes and spark gap) that is connected to a first terminal 31 of a strip 35. A first multiplexor control signal 25 may go from computer 14 to multiplexor 23.

A timer input capture 27 of computer 14 may be connected via a resistor 28 and an input protection circuit 37 to a second terminal 32 of strip 35. Input 27 may also be connected via a resistor 29 to ground 21. A connection between resistor 28 and protection circuit 37 may be connected to a third input of multiplexor 23.

A second switch control output 42 from computer 14 may go to a switch 44. One side of switch 44 may be connected via resistor 45 to ground 21, and another side of switch 44 may be connected via a protection circuit 38 to a third terminal 33 of strip 35. A third switch control output 43 of computer 14 may go to a switch 46. One side of switch 46 may be connected via a resistor 47 to ground 21, and another side of switch 46 may be connected to one side of protection circuit 38 that is connected to the other side of switch 44. A common connection of the other side of switch 46 and the other side of switch 44, and the one side of protection circuit 38, may be connected to a fourth input of multiplexor 23. A fourth terminal 34 of strip 35 may be connected to ground 21.

A first output of multiplexor 23 may go to four inputs of a dual 4:1 multiplexor 51 and a second output of multiplexor 23 may go to another four inputs of multiplexor 51. A second multiplexor control signal 52 may go from computer 14 to multiplexor 51. A first output from multiplexor 51 may go to an inverting input of an instrumentation amplifier 54. A second output from multiplexor 51 may go to a noninverting input of amplifier 54. An output of amplifier 54 may be an analog to digital converter input 55 to computer 14. A gain resistor 56 of amplifier 54 may be a digital potentiometer adjustable by an instrumentation amplifier gain control output 57 from computer 14. An offset resistor 58 having one end connected to a positive voltage source and another end connected to ground 21 may be a digital potentiometer adjustable by an instrumentation amplifier offset control output 59 from computer 14.

Figure 2:
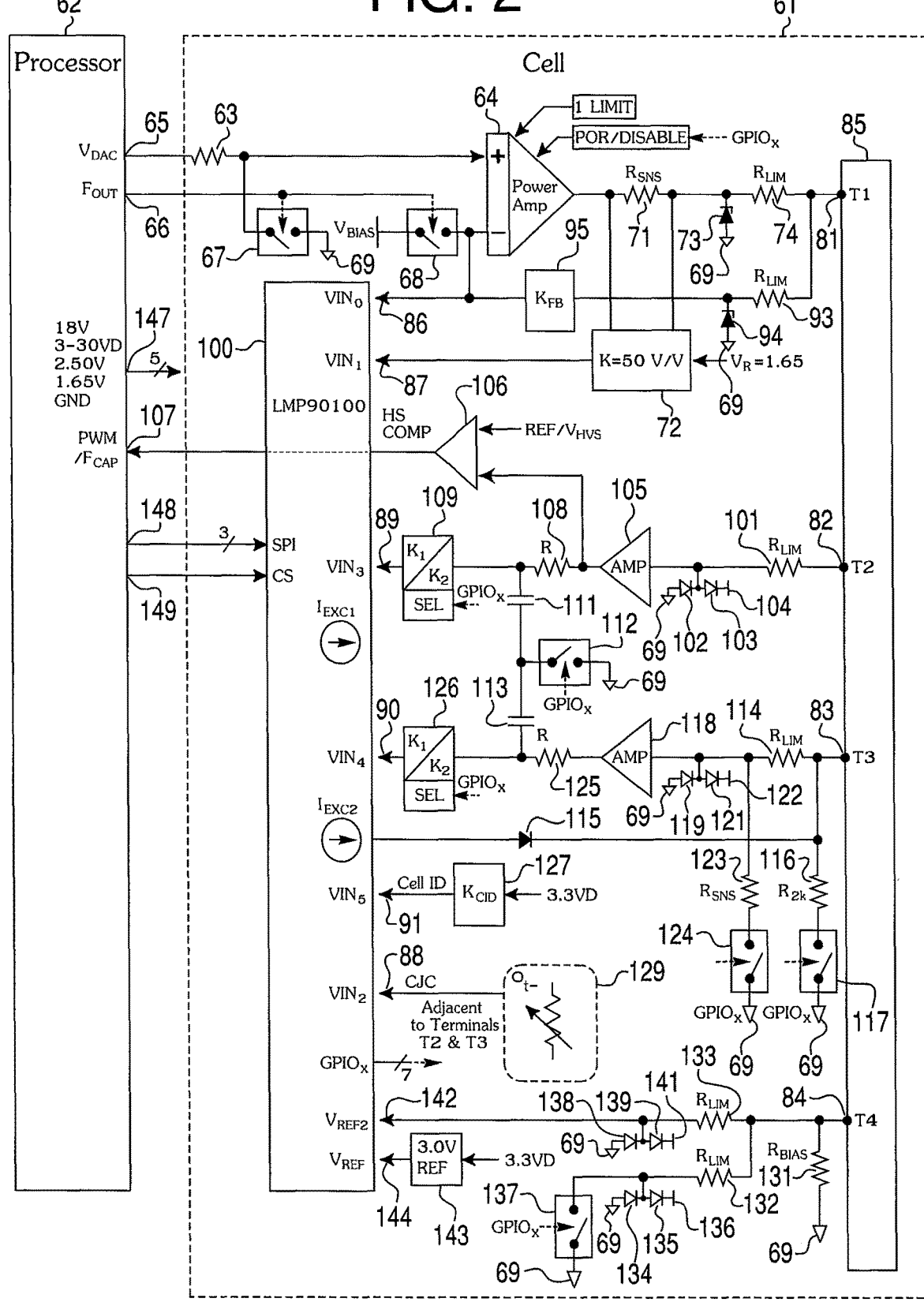
FIG. 2 is a diagram of another kind of layout of the analog cell.

The circuits of FIGS. 1-3, are merely examples of the cell. Connections and components of the circuit may be varied and/or changed as desired.

FIG. 2 is another type of diagram of an analog cell 61. A voltage signal 65 of a digital to analog converter of processor 62 may go through a resistor 63 to a non-inverting input of a power amplifier 64. An $F_{out}$ signal 66 from processor 62 may be a switch control signal to switches 67 and 68. One end of switch 67 may be connected to the non-inverting input of amplifier 64 and another end of switch 67 may be connected to a ground or reference voltage 69. Control signal 66 may open and close switches 67 and 68. For instance, when switches 67 and 68 are closed, then the non-inverting input of amplifier 64 may be grounded and the inverting input of amplifier 64 may be connected to a bias voltage. A limit input and a por/disable input with a control signal input may be connected to amplifier 64.

An output of amplifier 64 may be connected to one end of a resistor 71 and to a first input of a voltage gain mechanism 72. Another end of resistor 71 may be connected to a second input of mechanism 72, a cathode of a zener diode 73, and one end of a resistor 74. Another end of resistor 74 may be connected to a first terminal 81 of a terminal strip 85. An anode of diode 73 may be connected to ground 69. An output 87 of mechanism 72 may go as a VIN1 to a circuit 100. A resistor 93 may have one end connected to terminal 81 and another end connected to a cathode of a diode 94 and to an input of a gain mechanism 95. An output 86 of mechanism 95 may go as a VIN0 input to circuit 100, and go to inverting input of amplifier 69.

A second terminal 82 of strip 85 may be connected to one end of a resistor 101. Another end of resistor 101 may be connected to a cathode of a diode 102 and an anode of a diode 103. An anode of diode 102 may be connected to ground 69 and a cathode of diode 103 may be connected to a voltage 104. The other end of resistor 101 may also be connected to an input of an amplifier 105. An output of amplifier 105 may go to an input of a comparator 106. Another input of amplifier 106 may be connected to a reference voltage. An output of comparator 106 may be a PWM input 107 to processor 62.

The output of amplifier 105 may be connected to one end of a resistor 108. Another end of resistor 108 may be connected to a selectable gain mechanism 109 and to one end of a capacitor 111. An output 89 may go as a VIN3 to circuit 100. Another end of capacitor 110 may be connected to one side of a switch 112 and to one end of a capacitor 113. Another end of switch 117 may be connected to ground 69. Switch 112 may have a control input.

A third terminal 83 of strip 85 may be connected to one end of a resistor 114. Terminal 83 may be connected to a cathode of a diode 115, and to one end of a resistor 116. Another end of resistor 116 may be connected to one end of a switch 117. Another end of switch 117 may be connected to ground 69. Switch 117 may have a control input. An anode of diode 115 may be connected to a current source of circuit 100.

Another end of resistor 114 may be connected to an input of an amplifier 118. The other end of resistor 114 may be connected to a cathode of a diode 119 and an anode of a diode 121. An anode of diode 119 may be connected to a ground 69. A cathode of diode 121 may be connected to a voltage 122. The other end of resistor 114 may be connected to one end of a resistor 123. Another end of resistor 123 may be connected to one end of a switch 124. Another end of switch 124 may be connected to ground 69. Switch 124 may have a control input.

An output of amplifier 118 may be connected to one end of a resistor 125. Another end of resistor 125 may be connected to another end of capacitor 113, and to an input of a selectable gain mechanism 126. An output 90 of VIN4 from mechanism 126 may go to circuit 100.

A gain mechanism 127 may have a voltage input and a cell ID output 91 as a VIN5 to circuit 100. A temperature sensitive resistor 129 adjacent to terminals 83 and 84 may go as an output from resistor 129 as VIN2 to circuit 100.

A fourth terminal 84 of strip 85 may be connected to ground 69 via a resistor 131. Terminal 84 may be connected to one end of a resistor 132 and one end of a resistor 133. Another end of resistor 132 may be connected to a cathode of a diode 134 and to an anode of a diode 135. An anode of diode 134 may be connected to ground 69. A cathode of diode 135 may be connected to a voltage 136. The other end of resistor 132 may be connected to one end of a switch 137. Switch 137 may have another end connected to ground 69. Switch 137 may have a control input.

Another end of resistor 133 may be connected to a cathode of a diode 138 and to an anode of a diode 139. An anode of diode 138 may be connected to ground 69. A cathode of diode 139 may be connected to a voltage 141. The other end of resistor 133 may be an input 142 as a VREF2 to circuit 100. A voltage reference mechanism 143 may have an output 144 as a VREF1 to circuit 100. One or more control signals 145 may be provided by circuit 100 for various control inputs for switches, selectable gain mechanisms, and so forth in cell 61.

Processor 62 may provide various voltages at output 147 for components as desired of cell 61. Outputs 148 and 149 may provide signals or current from processor 62 to circuit 100.

Figure 3A:
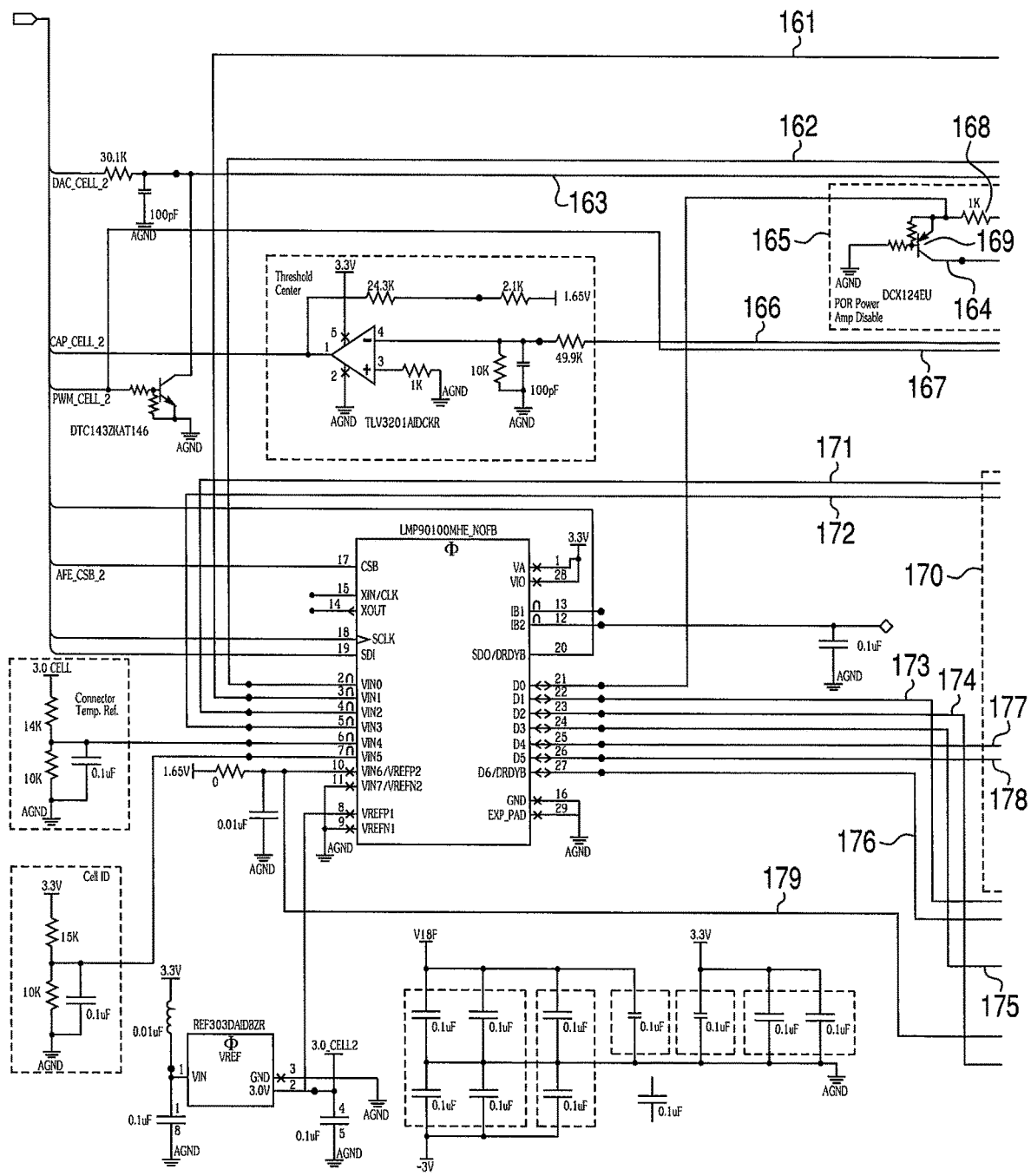
FIG. 3a and FIG. 3b are a schematic of an example analog cell.
Figure 3B:
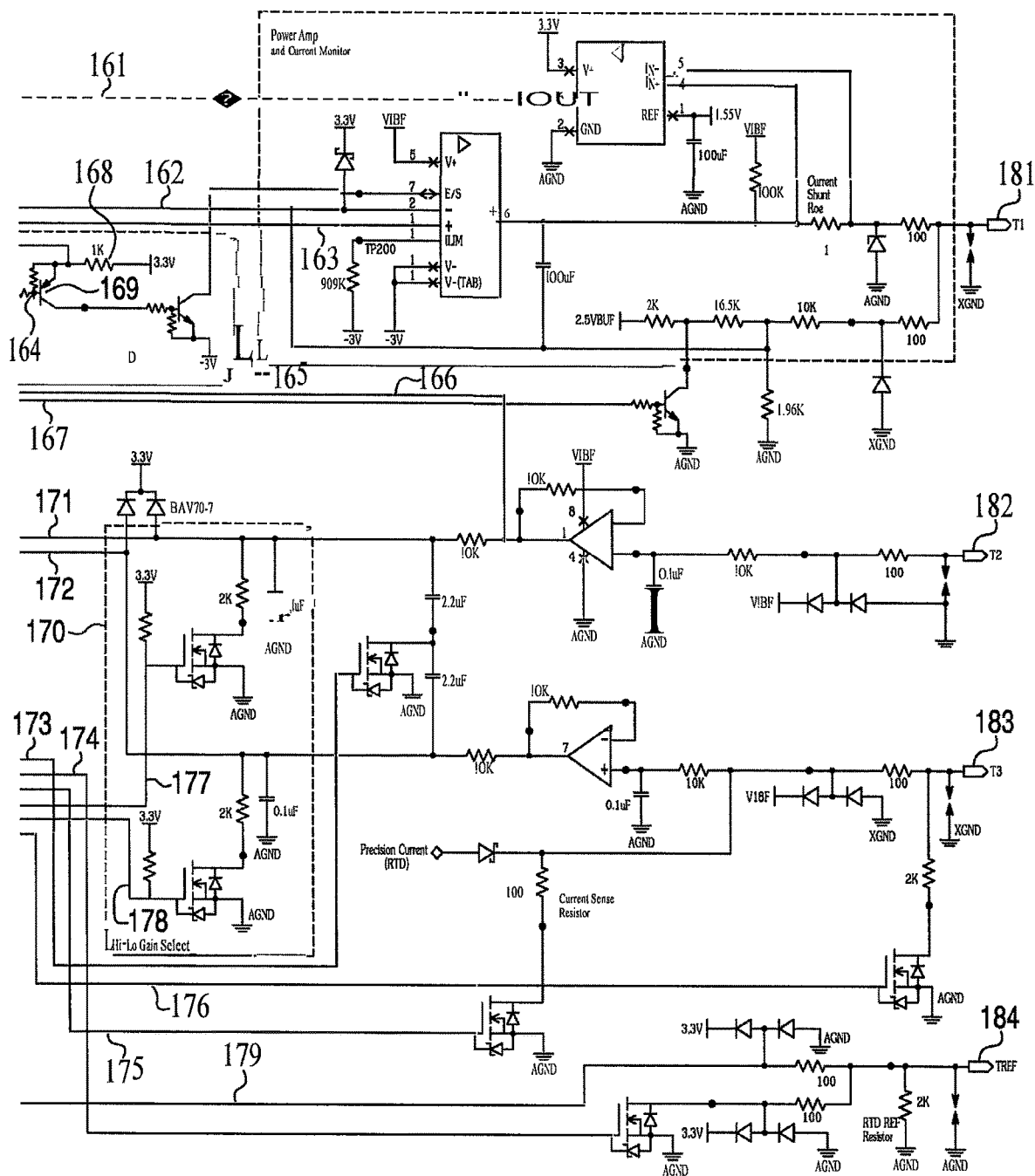

FIG. 3a and FIG. 3b are diagrams that reveal a schematic of an example cell and associated circuitry. Other designs may be used or a design of the present schematic may be modified for a particular application. Common connections and components of FIGS. 3a and 3b for the schematic may be designated by numerals 161-179. The terminals T1, T2, T3 and T4 of the cell are indicated by numerals 181, 182, 183 and 184, respectively.

Figures 4, 5:
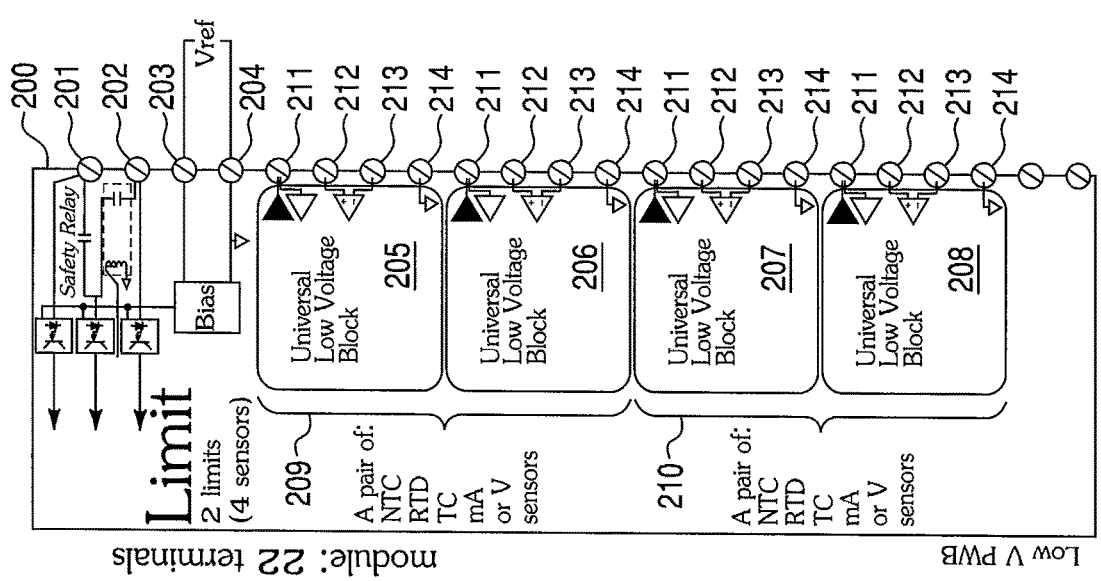
FIG. 4 is a diagram of a module of cells for sensors.
FIG. 5 is a diagram of a module of cells for input/output circuits.

FIG. 4 is a diagram of a cell module 200. There may be terminals 201 and 202 for a safety relay and terminals 203 and 204 for a reference voltage. There may be four cells 205, 206, 207 and 208 arranged in pairs 209 and 210. Each cell may have terminals 211, 212, 213 and 214. Each one of pairs 209 and 210 may provide for NTC, RTD, TC, mA or V sensors.

FIG. 5 is a diagram of a cell module 220 of cells 215, 216, 217 and 218. Each cell may have terminals 211, 212, 213 and 214. The cells 215-218 may provide for eight analog I/O circuits (e.g., four analog blocks).

FIG. 6 is a diagram of screen shot 250 of a display for applications of interface for various circuits using a common set of terminals of the present universal cell. Analog block wire sheets 251 and 252 are shown in layout 254. Various circuits and terminals of a cell block are shown in a list 253. A maximum number of circuits may be indicated for four cells as revealed on the right column of list 253.

FIG. 7-18 are diagrams of example circuits that may be interfaced with some or all four terminals T1-T4 which can have numeral designations of 261, 262, 263 and 264. At the top of layout 254 containing wire sheets 251 and 252, may be a choice of selections of "Analog I/O", "Fuel Air" and "Limit".

Figure 7:
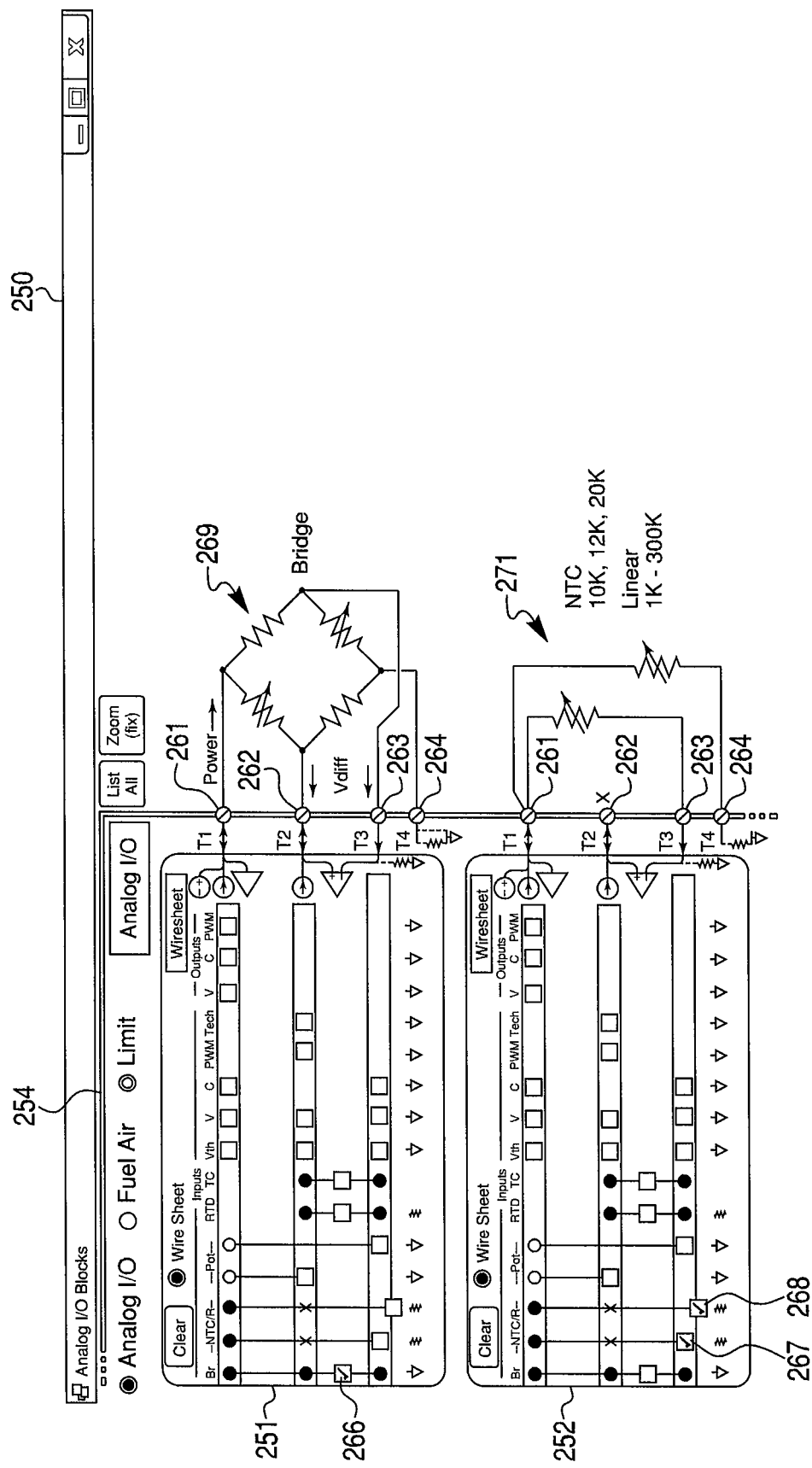
FIGS. 7-18 are diagrams of screenshots of a display of various wire sheets that may show radio buttons that can be clicked to provide configuration choices of inputs and outputs, and various circuits with connections to terminals of the cells.
Figure 8:
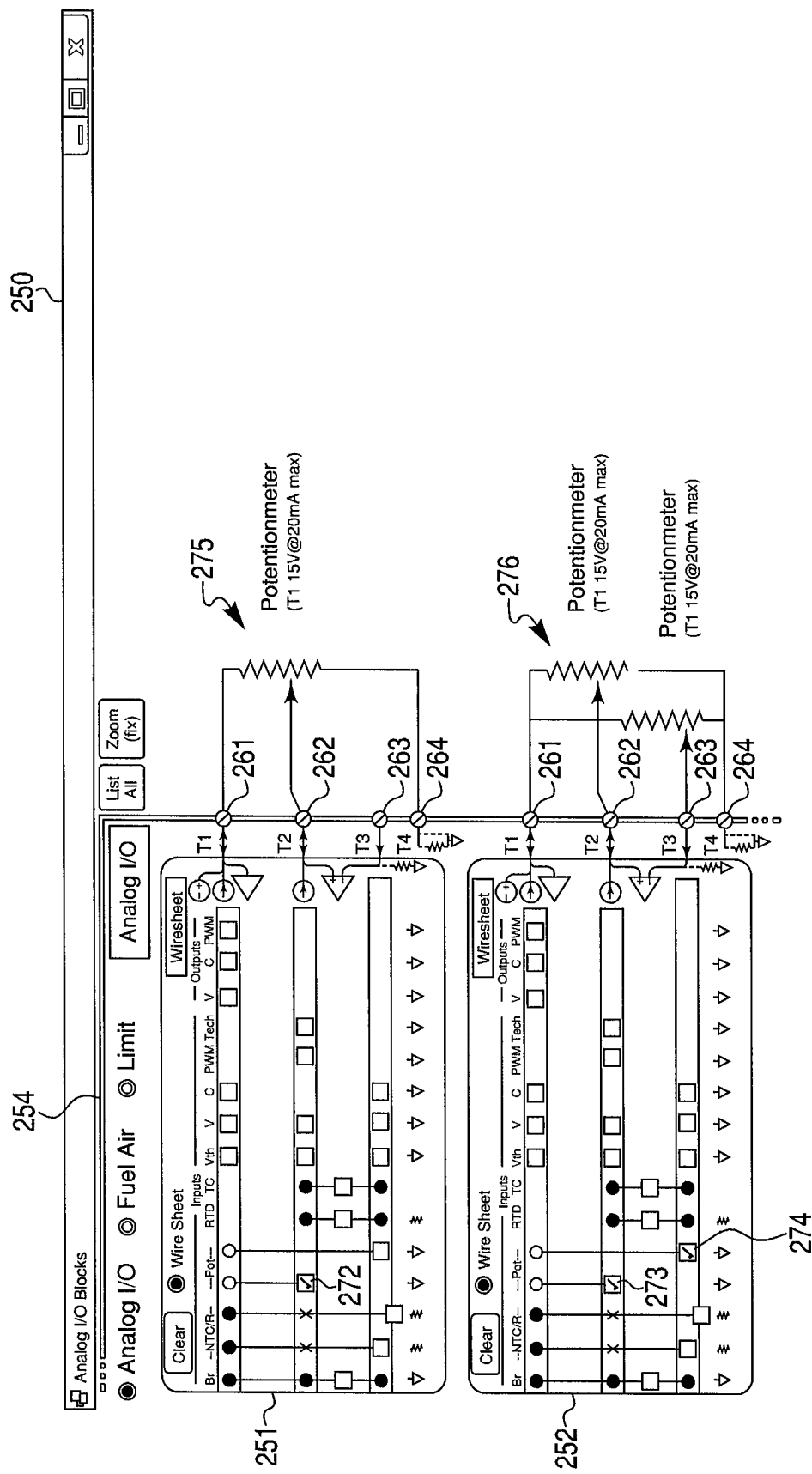
Figure 9:
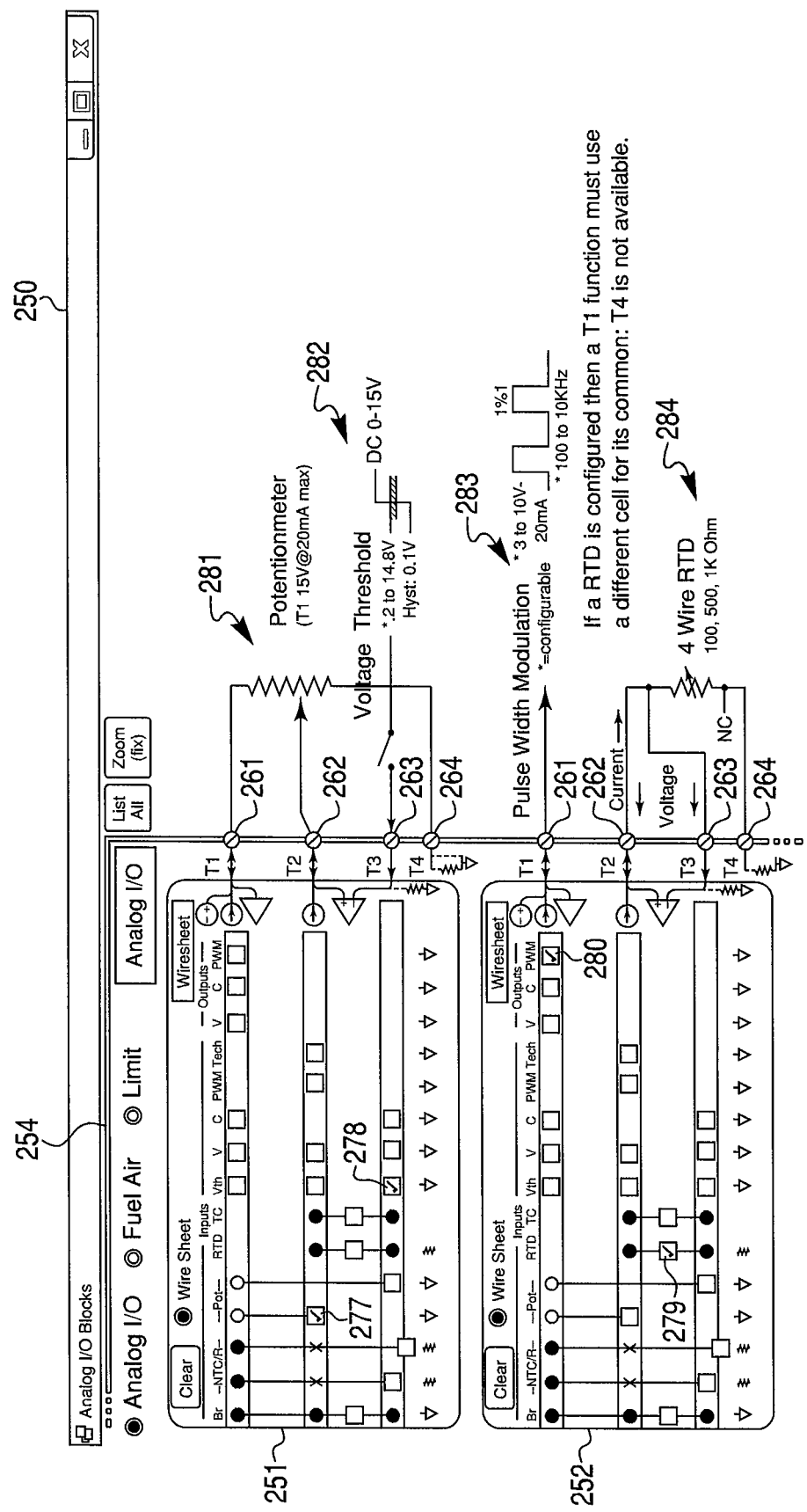
Figure 10:
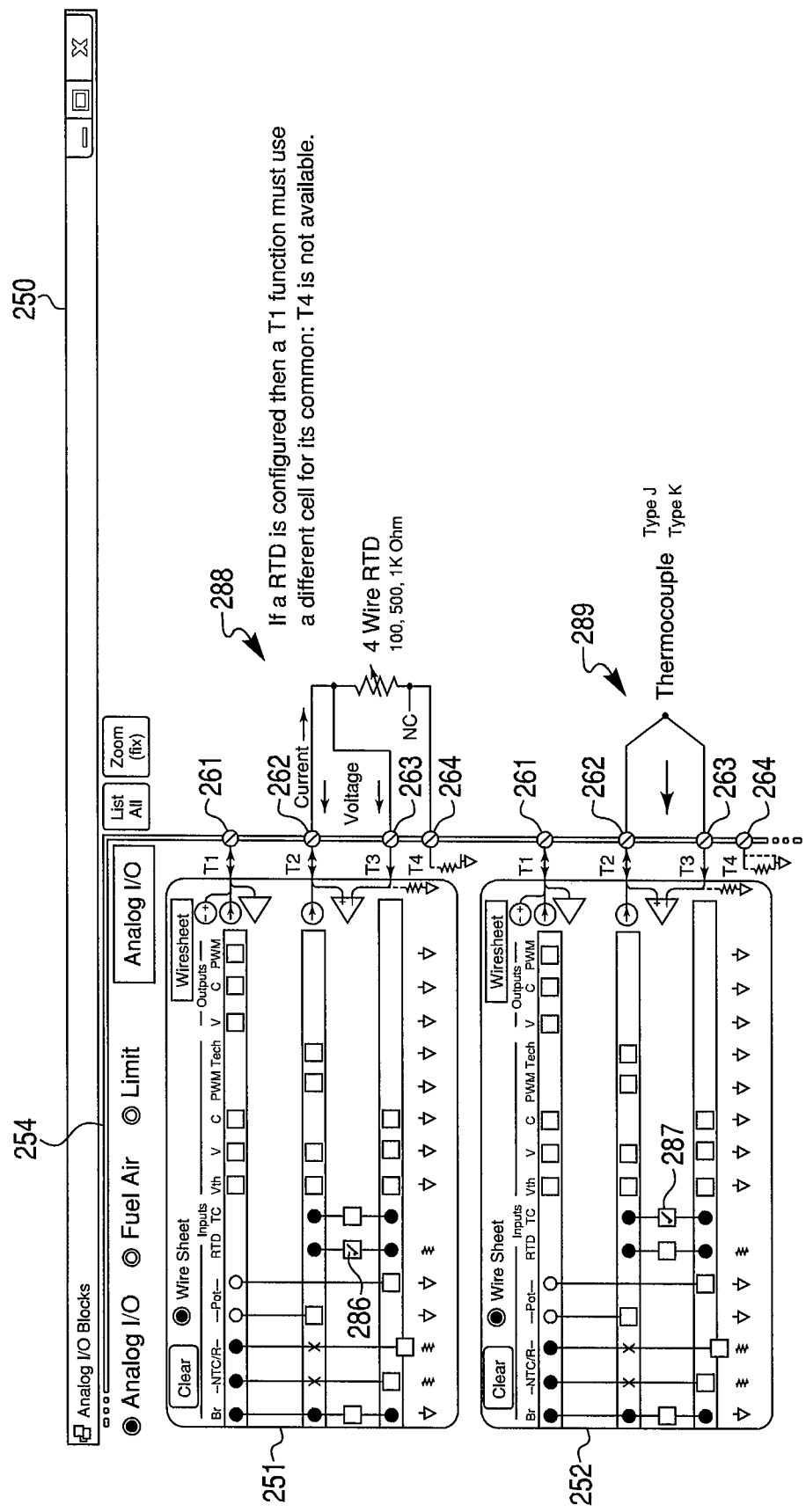

FIG. 7 is a diagram of wire sheets 251 and 252 with buttons 266, 267 and 268 checked for a Bridge circuit 269 and two NTC circuits 271. FIG. 8 is a diagram of the wire sheets with buttons 272, 273 and 274 checked for Potentiometers 275 and 276. FIG. 9 is a diagram of the wire sheets with buttons 277, 278, 279 and 280 checked for a Potentiometer 281, Voltage Threshold 282, Pulse Width Modulation 283 and RTD 284, respectively. FIG. 10 is a diagram of the wire sheets with buttons 286 and 287 checked for a Four-Wire RTD 288 and a Thermocouple 289.

Figure 11:
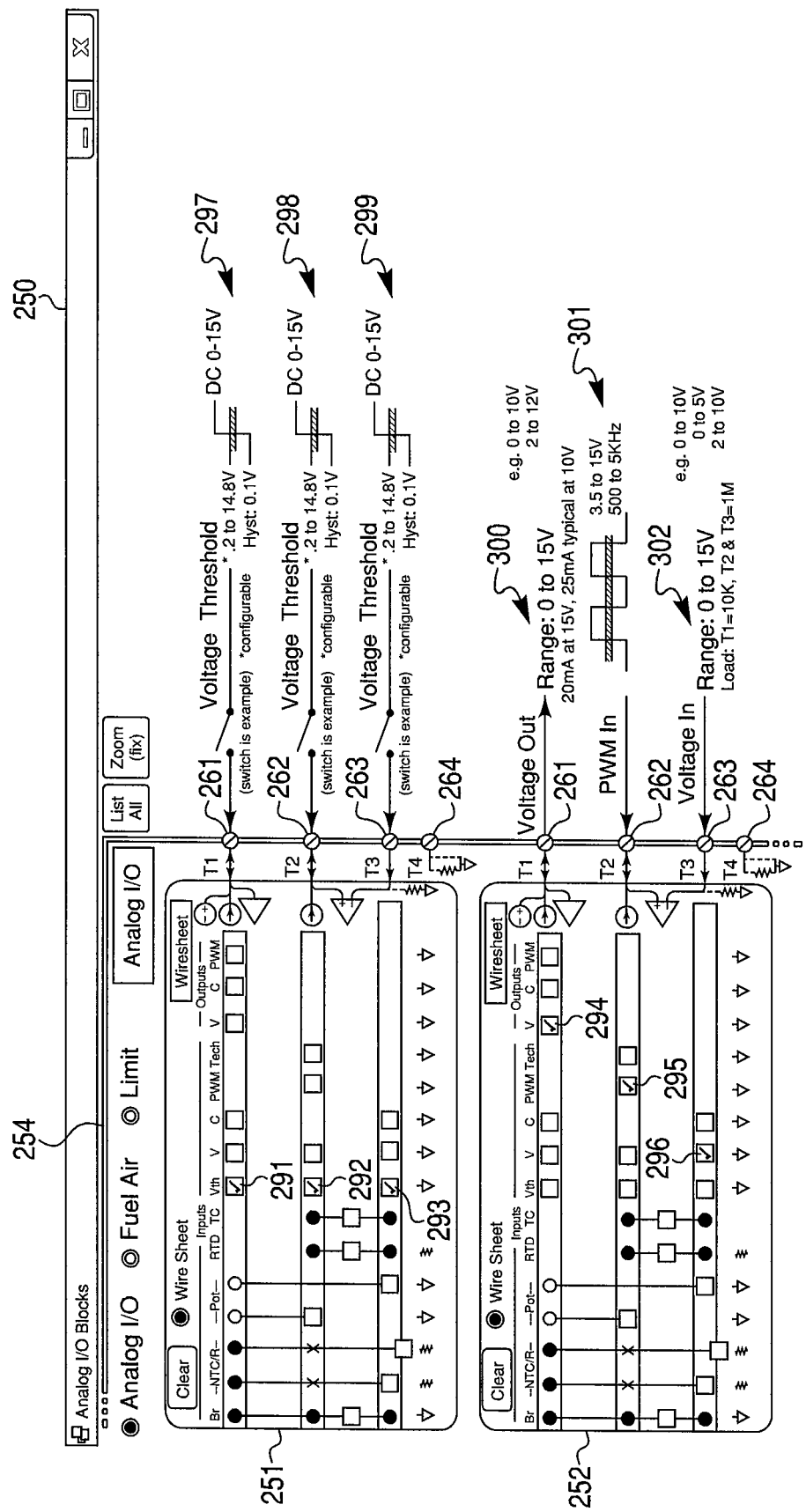
Figure 12:
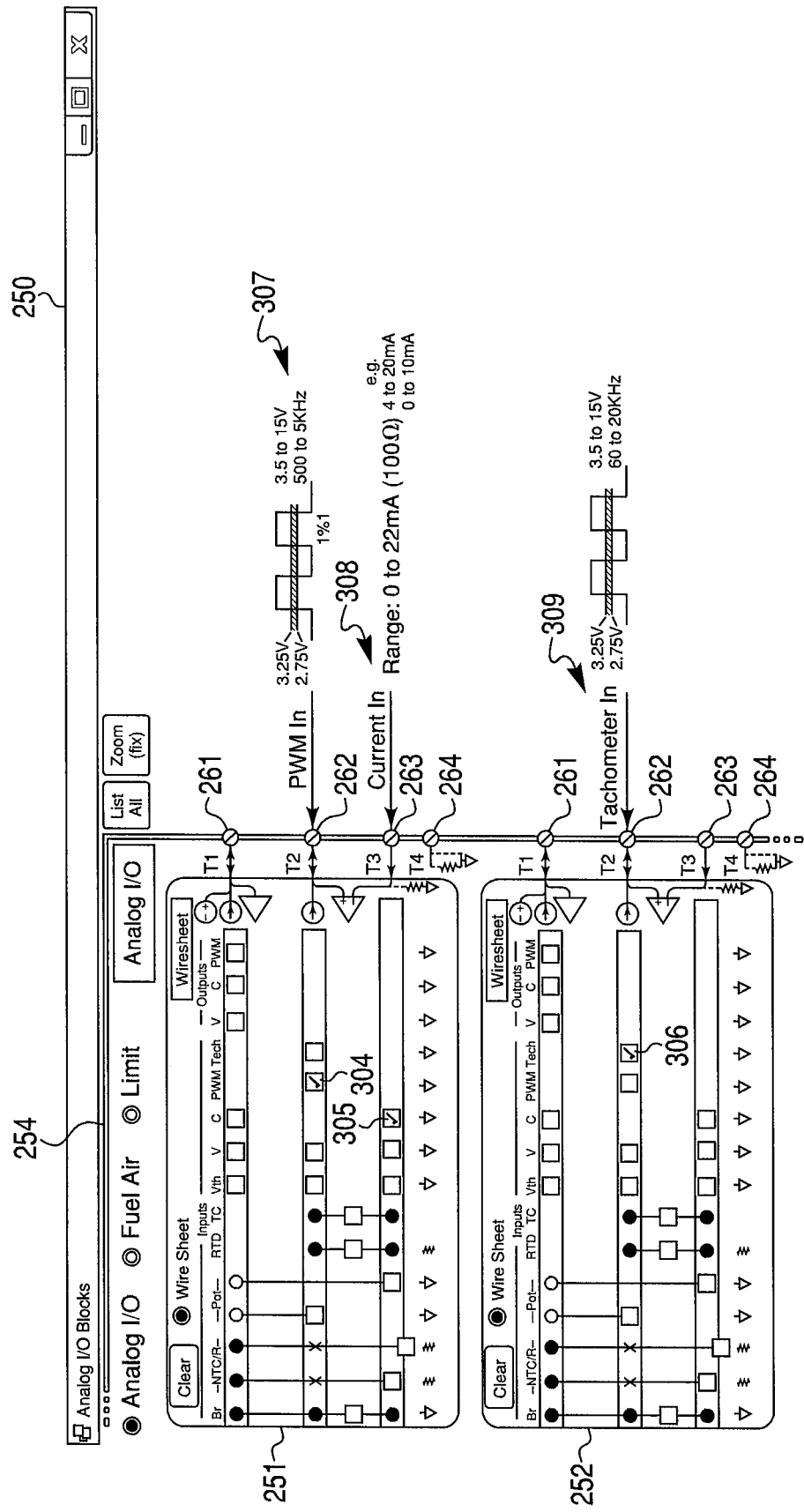
Figure 13:
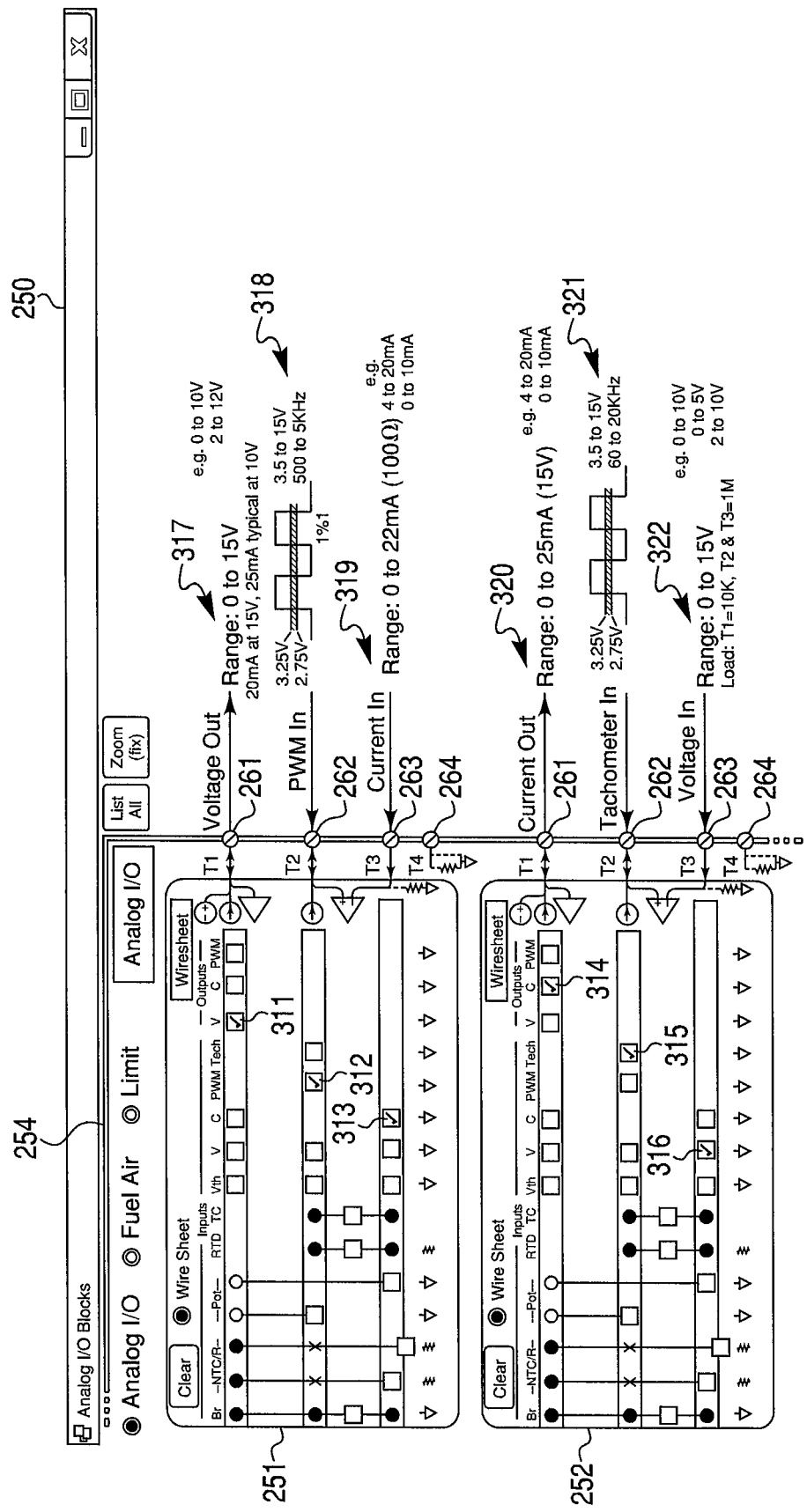
Figure 14:
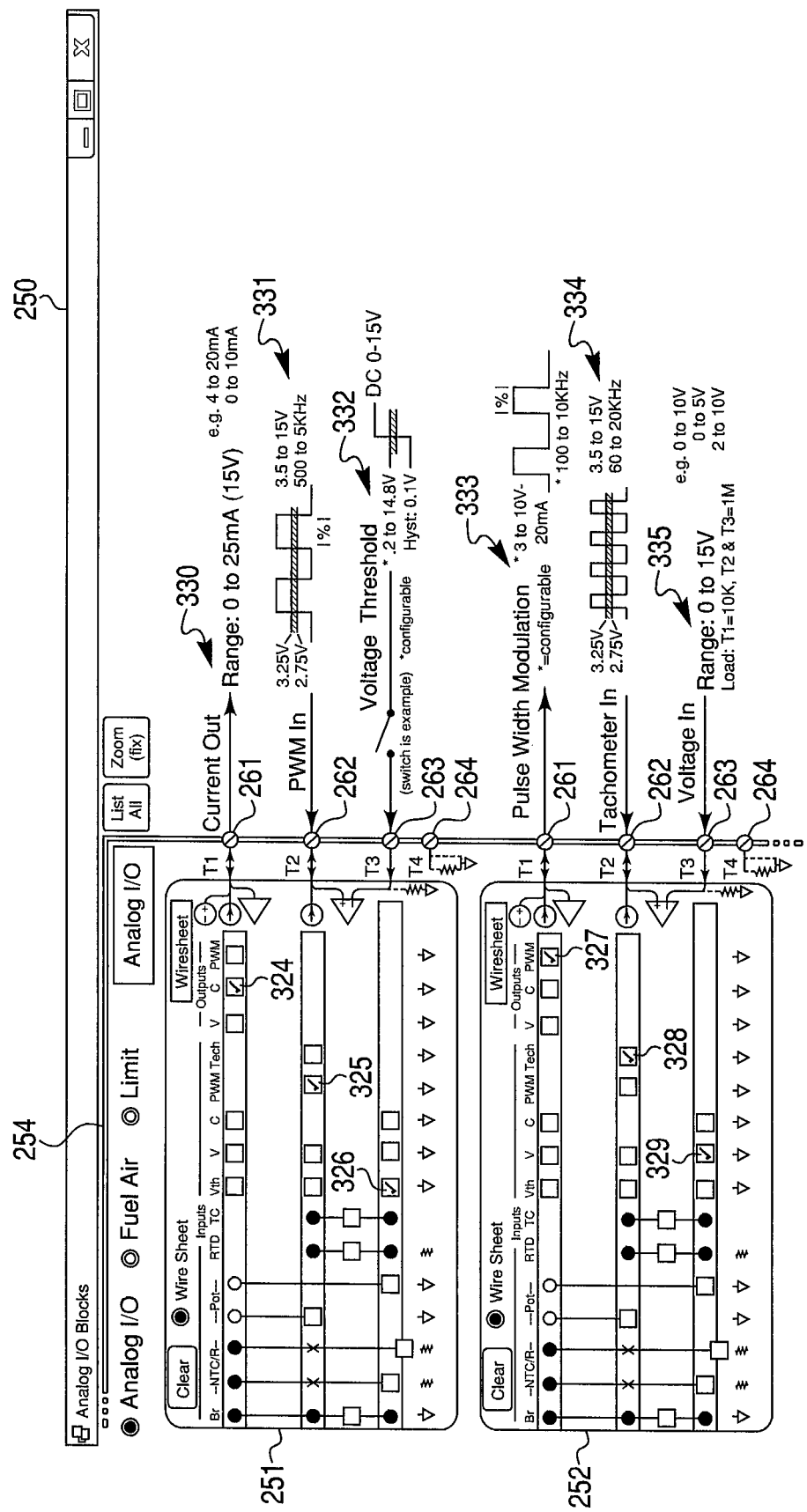

FIG. 11 is a diagram of the wire sheets with buttons 291, 292, 293, 294, 295 and 296 checked for a first Voltage Threshold 297, a second Voltage Threshold 298, a third Voltage Threshold 299, a Voltage Out 300, a PWM In 301, and a Voltage In 302. FIG. 12 is a diagram of the wire sheets with buttons 304, 305 and 306 checked for a PWM In 307, Current In 308 and Tachometer In 309. FIG. 13 is a diagram of the wire sheets with buttons 311, 312, 313, 314, 315 and 316 checked for a Voltage Out 317, PWM In 318, Current In 319, Current Out 320, Tachometer In 321 and Voltage In 322. FIG. 14 is a diagram of the wire sheets with buttons 324, 325, 326, 327, 328 and 329 checked for a Current Out 330, PWM In 331, Voltage Threshold 332, Pulse Width Modulation 333, Tachometer In 334 and Voltage In 335, respectively.

Figure 15:
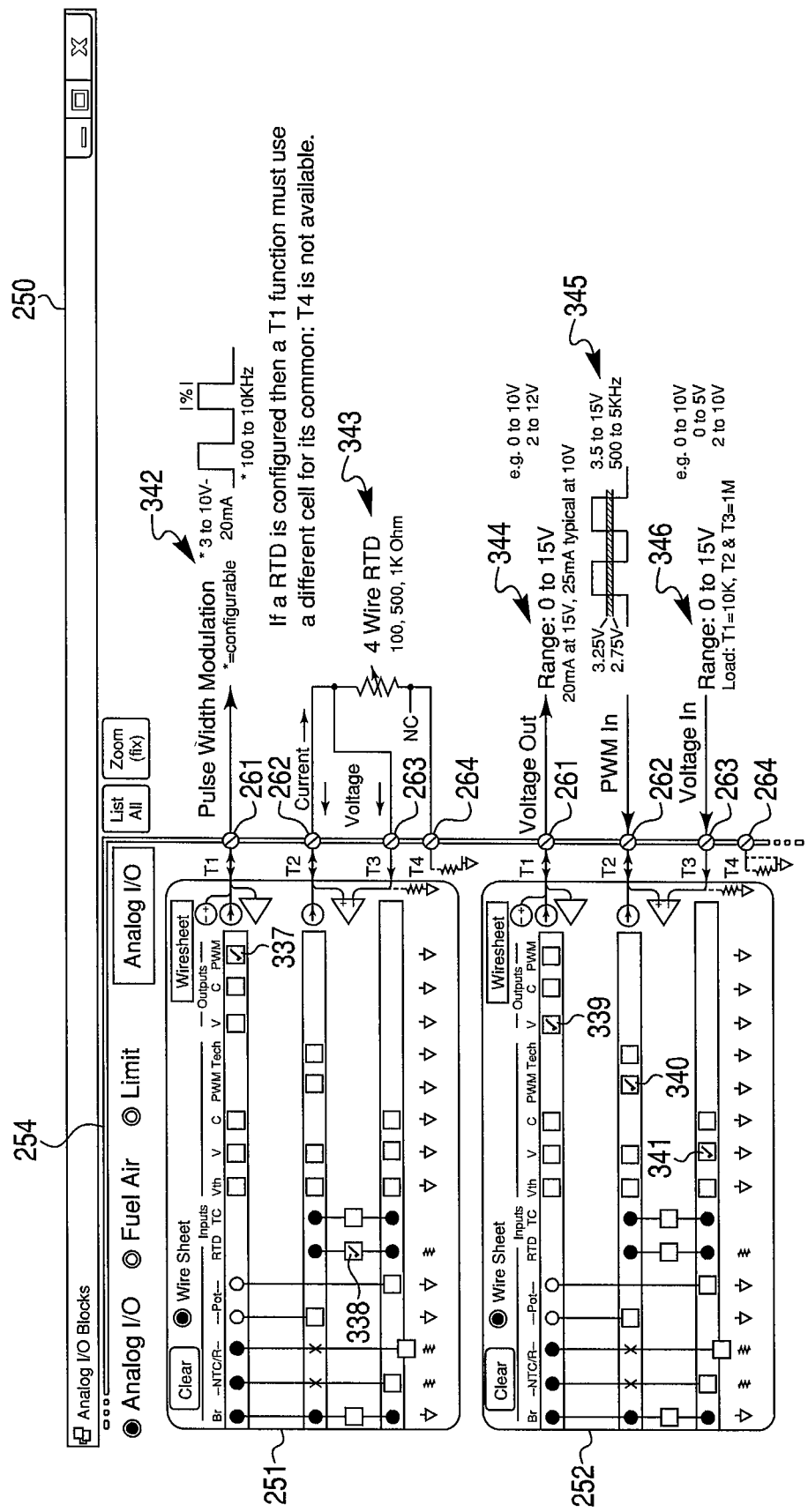

FIG. 15 is a diagram of wire sheets with buttons 337, 338, 339, 340 and 341 checked for a Pulse Width Modulation 342, Four-Wire RTD 343, Voltage Out 344, PWM In 345 and Voltage In 346.

Figure 16:
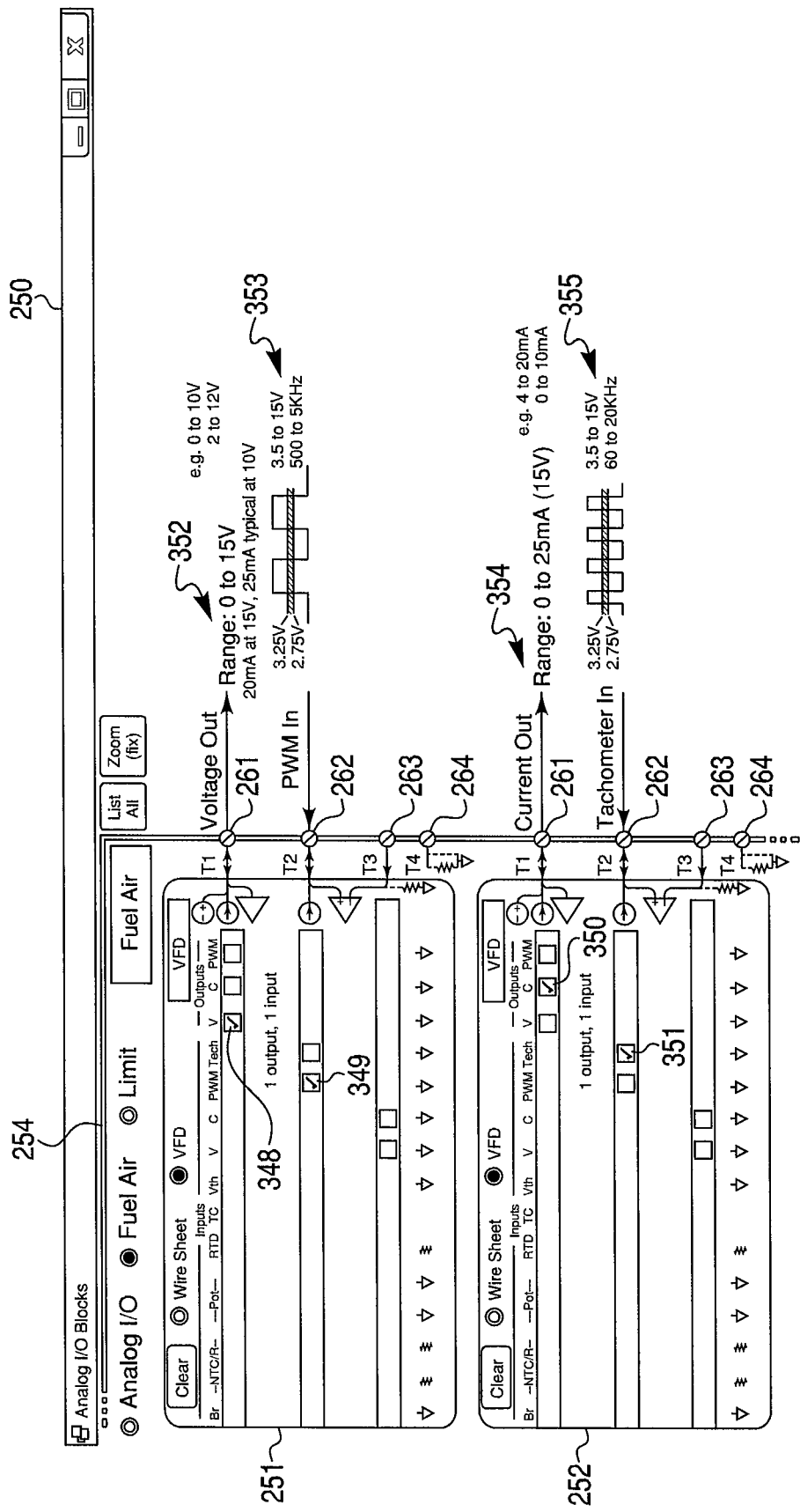
Figure 17:
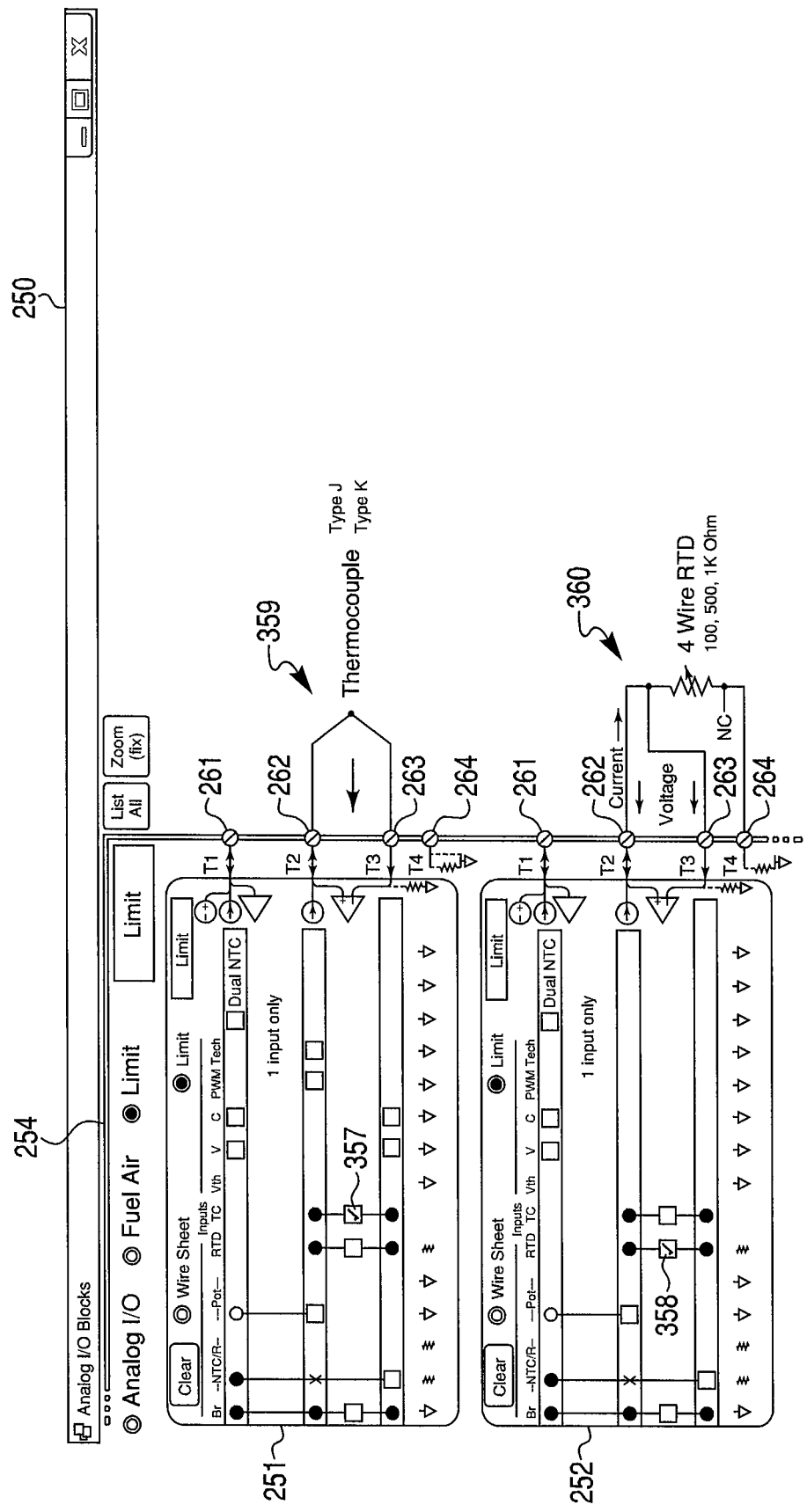

FIG. 16 is a diagram with "Fuel Air" selected above wire sheet 251. Buttons 348, 349, 350 and 351 of the wire sheets may be checked for a Voltage Out 352, PWM In 353, Current Out 354 and Tachometer In 355, respectively. FIG. 17 is a diagram with "Limit" selected above wire sheet 251. Buttons 357 and 358 may be checked for a Thermocouple 359 and Four-Wire RTD 360, respectively.

Figure 18:
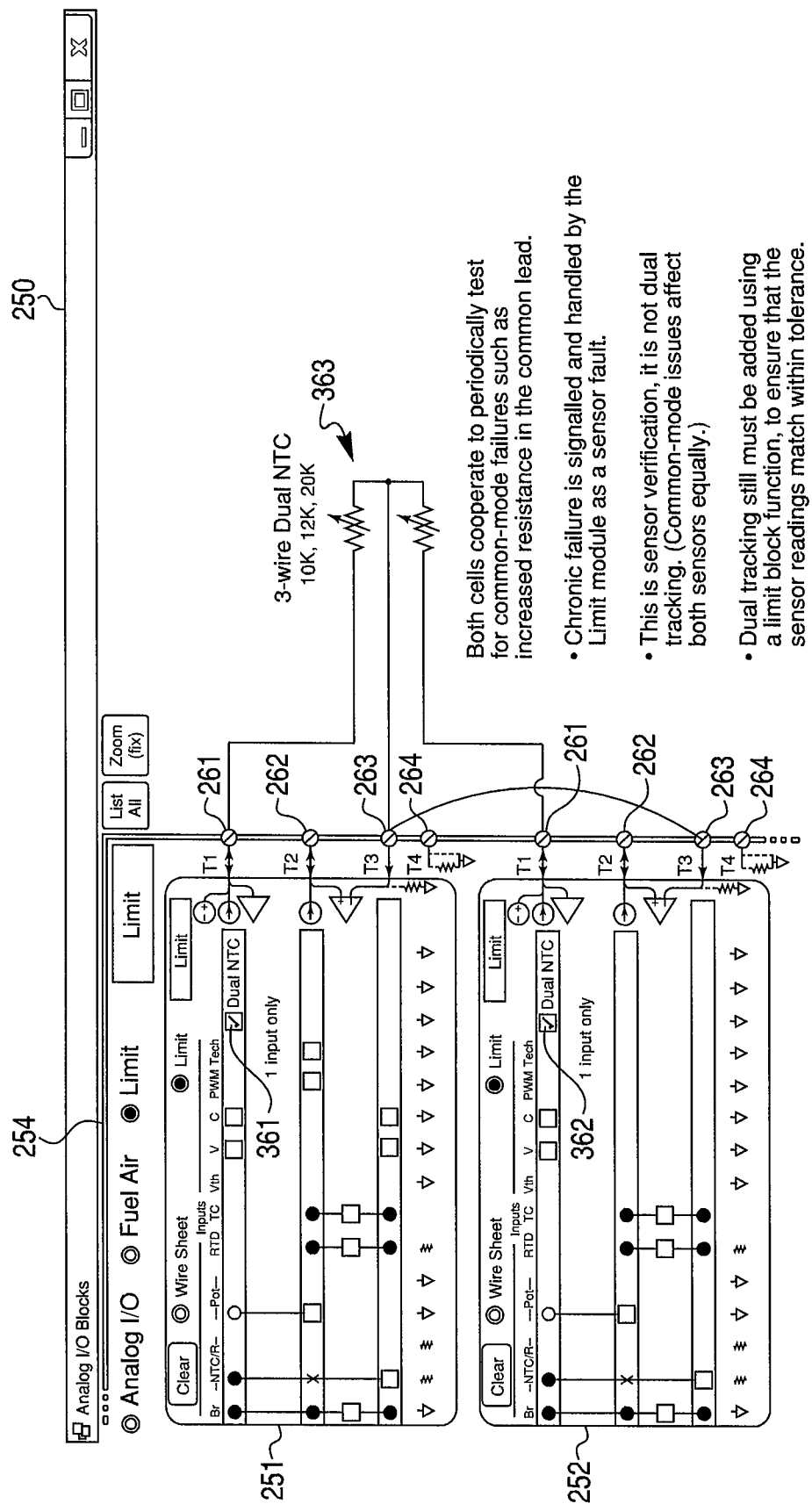

FIG. 18 is a diagram of the wire sheets with buttons 361 and 362 that may be checked for a Three-Wire Dual NTC 363. Both cells for wire sheets 251 and 252 may cooperate to periodically test for common-mode failures such as increased resistance in a common mode.

To recap, a universal interface system may incorporate a cell, and a computer connected to the cell. The cell may incorporate one or more terminals. The cell may provide at the one or more terminals inputs and outputs that are configured to be compatible for a set of electrical components of a heating, ventilation and air conditioning (HVAC) system. The one or more terminals may provide inputs and outputs that are reconfigured to be compatible for a different set of electrical components of the HVAC system. Inputs and outputs at the one or more terminals may be configured at the cell incorporating signals from the computer according to a program. The computer may provide a display of a screen showing items to click on for providing appropriate values at the one or more terminals for connection by the one or more components of a set of electrical components.

The sets of one or more electrical components may incorporate one or more sensors and/or actuators.

The one or more sensors or actuators may be selected from a group incorporating bridge sensors, NTC sensors, RTD sensors, powered potentiometers, and actuators with feedback.

Inputs and outputs at one or more terminals may be selected from a group incorporating current inputs, current outputs, voltage inputs, voltage outputs, thermocouple inputs, voltage threshold detections, tachometer inputs, PWM inputs, PWM outputs, and frequency/pulse generator outputs.

The computer may configure a cell for a particular sensor or actuator to be connected to the one or more terminals according to the program.

A cell may support two or more sensors or actuators at one time.

A user may select from a list of configurations on a screen for use or a making.

One or more terminals of the cell may provide analog signal inputs and outputs to an appropriate connection of the sensors and actuators.

The one or more terminals may have input signals and output signals with magnitudes less than 50 volts.

The system may further incorporate additional cells that are numbered in groups of two or more cells. Each of the cells may have a set of four terminals. Each set of four terminals may provide an interface for up to a certain number of, such as three, analog I/O circuits to support a certain number of, such as three, sensors and/or actuators at one time.

An approach for providing interfaces for analog mechanisms, may incorporate obtaining a cell having circuitry with a predetermined number of terminals, configuring the circuitry for obtaining one or more interfaces at the predetermined number of terminals for a first kind of one or more sensors and/or actuators, reconfiguring the circuitry according to a program for obtaining another one or more interfaces at the predetermined number of terminals for a second kind of one or more sensors and/or actuators, and connecting a processor to the cell that configures or reconfigures the circuitry for obtaining the one or more interfaces appropriate for a kind of the one or more sensors and/or actuators.

The approach may further incorporate determining a number for the predetermined number of terminals by setting the number where there are two or less terminals remaining when the one or more sensors and/or actuators are connected to the predetermined number of terminals.

The one or more sensors and/or actuators may be selected from a group incorporating bridge sensors, NTC sensors, RTD sensors, powered potentiometers, and actuators with feedback. One or more inputs and outputs at one or more terminals may be selectable for one or more items from a group incorporating current inputs, current outputs, voltage inputs, voltage outputs, thermocouple inputs, voltage threshold detection inputs, tachometer inputs, PWM inputs, PWM outputs, and frequency/pulse generator outputs.

The approach may further incorporate adding one or more cells. Each cell may have circuitry connected to a predetermined number of terminals.

The approach may further incorporate configuring the circuitry of a cell for obtaining one or more interfaces at the predetermined number of or less terminals for a first kind of electrical components, reconfiguring the circuitry of the cell for obtaining another one or more interfaces at the predetermined number of or less terminals for a second kind of electrical components, and connecting a processor to the cell that configures and reconfigures the circuitry according to a program for obtaining the one or more interfaces at the predetermined number of or less terminals.

The approach may further incorporate predetermining a number of terminals by setting the number where there are two or less terminals remaining when the one or more electrical components are connected to the predetermined number of terminals. The one or more electrical components may be selected from a group incorporating bridge sensors, NTC sensors, RTD sensors, powered potentiometers, and actuators with feedback. One or more inputs and outputs at the predetermined number of terminals may be selected from a group incorporating current inputs, current outputs, voltage inputs, voltage outputs, thermocouple inputs, voltage threshold detection inputs, tachometer inputs, PWM inputs, PWM outputs, and frequency/pulse generator outputs.

An analog interface block mechanism may incorporate an interface block having configurable inputs and outputs, and a processor connected to the interface block. The interface block may incorporate circuitry that is affected by a program executed by the processor to result in configured inputs and outputs of the interface block. The inputs and outputs may be configured for establishing compatibility with a first set of one or more sensors and/or actuators of an HVAC system, that are connected to the inputs and outputs of the interface block. The inputs and outputs may be reconfigured for establishing compatibility with a second set of one or more sensors and/or actuators of an HVAC system, that are connected to the inputs and outputs of the interface block.

The mechanism may further incorporate a display for showing a dialog box having items that are selectable for configuring an input or output of the interface block for a compatible connection with a sensor or actuator.

The mechanism may further incorporate one or more additional interface blocks like the first interface block, connected to the processor. Each of the additional interface blocks may incorporate configurable inputs and outputs. Each of the additional interface blocks may incorporate circuitry that is affected by a program executed by the processor to result in configured inputs and outputs of the interface block. The inputs and outputs may be configured for establishing compatibility with a third set of one or more sensors and/or actuators that are connected to the inputs and outputs of the interface block.

The inputs and outputs may be reconfigured for establishing compatibility with a fourth set of one or more sensors and/or actuators that are connected to the inputs and outputs of the interface block.

There may be an M number of interface blocks. Each interface block may incorporate an N number of terminals. One or more terminals of the N number of terminals of an interface block may be configured to be an input/output for a selected sensor or actuator. The one or more terminals of the N number of terminals of the same interface block may be reconfigured to be an input/output for another selected sensor or actuator. The N number of terminals may be kept at a minimum.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A universal interface system for a heating, ventilation and air conditioning (HVAC) system configured to connect to and operate with electrical components of the HVAC system comprising:
   two or more cells wherein each cell has a set of four terminals; and
   a computer connected to each of the two or more cells, the computer executing a computer program; and
   wherein:
   each of the two or more cells provides at its four terminals inputs and outputs that are configured to be compatible for one or more sets of the electrical components of the HVAC system, wherein the one or more sets of the electrical components comprise one or more sensors and/or actuators, and wherein each set of four terminals can provide an interface for up to such as three analog I/O circuits to support such as three sensors and/or actuators at one time;
   the four terminals at each of the cells providing inputs and outputs are reconfigured to be compatible for a different set of electrical components of the HVAC system;
   inputs and outputs at the cell's terminals are configured at the cell incorporating signals from the computer according to the computer program to connect to and operate with one or more of the HVAC sensors and/or actuators; and
   the computer providing a display screen showing items to click on for providing appropriate values at the terminals for connection by the one or more components of a set of electrical components, the display screen including one or more radio buttons to select at least one of an analog I/O module, a fuel air module, or a limit module, wherein when a fuel air module or a limit module is selected, each of the cells in those cases includes a radio button to either have the cell be used for the local safety purpose, or donated as a full-featured wire sheet cell.

2. The system of claim 1, wherein the one or more sensors or actuators are selected from a group comprising bridge sensors, NTC sensors, RTD sensors, powered potentiometers, and actuators with feedback.

3. The system of claim 1, wherein inputs and outputs at one or more terminals are selected from a group comprising current inputs, current outputs, voltage inputs, voltage outputs, thermocouple inputs, voltage threshold detections, tachometer inputs, PWM inputs, PWM outputs, and frequency/pulse generator outputs.

4. The system of claim 1, wherein a cell can support two or more sensors or actuators at one time.

5. The system of claim 1, wherein a user can select from a list of configurations on a screen for use.

6. The system of claim 1, wherein one or more terminals of the cell provide analog signal inputs and outputs to appropriate connection of the sensors and actuators.

7. The system of claim 1, wherein the one or more terminals have input signals and output signals having magnitudes less than 50 volts.

8. A method for heating, ventilation and air conditioning (HVAC) system configured to connect to and operate with electrical components of the HVAC system providing universal interfaces, comprising:
   providing one or more cells, wherein each cell has circuitry connected to a predetermined number of terminals that are configured to be compatible for one or more sets of the electrical components of a HVAC system;
   configuring the circuitry of a cell for obtaining one or more interfaces at the predetermined number of or less terminals for a first kind of one or more sensors and/or actuators;
   reconfiguring the circuitry of the cell according to a program for obtaining another one or more interfaces at the predetermined number of or less terminals for a second kind of one or more sensors and/or actuators; and
   connecting a processor executing a computer program, to the cell that configures or reconfigures the circuitry for obtaining the one or more interfaces at the predetermined number of or less terminals appropriate for a kind of the one or more sensors and/or actuators to connect to and operate with one or more of the HVAC sensors and/or actuators; and providing a display screen showing items to click for providing appropriate values at the one or more terminals for connection by the one or more components of a set of electrical components, the screen comprises one or more radio buttons to select at least one of an analog I/O module, a fuel air module, or a limit module, wherein when a fuel air module or a limit module is selected, each of the two cells in those cases includes a radio button to either have the cell be used for the local safety purpose, or donated as a full-featured wire sheet cell.

9. The method of claim 8, wherein:

the one or more sensors and/or actuators are selected from a group comprising bridge sensors, NTC sensors, RTD sensors, powered potentiometers, and actuators with feedback; and one or more inputs and outputs at one or more terminals are selectable for one or more items from a group comprising current inputs, current outputs, voltage inputs, voltage outputs, thermocouple inputs, voltage threshold detection inputs, tachometer inputs, PWM inputs, PWM outputs, and frequency/pulse generator outputs.

10. An analog interface for a heating, ventilation and air conditioning (HVAC) system configured to connect to and operate with electrical components of the HVAC system comprising:

an interface block comprising configurable inputs and outputs; and a processor connected to the interface block executing a computer program; and wherein:

the interface block comprises circuitry that is affected by the computer program executed by the processor to result in configured inputs and outputs of the interface block that are configured to be compatible for one or more sets of the electrical components of HVAC system, wherein the one or more sets of electrical components comprise one or more sensors and/or actuators;

the inputs and outputs are configured for establishing compatibility with a first set of one or more sensors and/or actuators of an HVAC system, that are connected to the inputs and outputs of the interface block to connect to and operate with one or more of the HVAC sensors and/or actuators; and the inputs and outputs are reconfigured for establishing compatibility with a second set of one or more sensors and/or actuators of an HVAC system, that are connected to the inputs and outputs of the interface block to connect to and operate with one or more of the HVAC sensors and/or actuators; and the processor configured for providing a display screen showing items to click on for providing appropriate values at the one or more terminals for connection by the one or more components of a set of electrical components, the display screen including one or more radio buttons to select at least one of an analog I/O module, a fuel air module, or a limit module, wherein when a fuel air module or a limit module is selected, each of the two cells in those cases includes a radio button to either have the cell be used for the local safety purpose, or donated as a full-featured wire sheet cell; and one or more additional interface blocks like the first interface block, connected to the processor; and wherein:

each of the additional interface blocks comprises configurable inputs and outputs;

each of the additional interface blocks comprises circuitry that is affected by a program executed by the processor to result in configured inputs and outputs of the interface block;

the inputs and outputs are configured for establishing compatibility with a third set of one or more sensors and/or actuators that are connected to the inputs and outputs of the interface block.

11. The analog interface of claim 10, further comprising a display for showing a dialog box having items that are selectable for configuring an input or output of the interface block for a compatible connection with a sensor or actuator.

12. The analog interface of claim 10, wherein the inputs and outputs are reconfigured for establishing compatibility with a fourth set of one or more sensors and/or actuators that are connected to the inputs and outputs of the interface block.

* * * * *